United States Patent
Saitou et al.

(10) Patent No.: US 9,344,577 B2
(45) Date of Patent: May 17, 2016

(54) CONTROL METHOD, TRANSMISSION APPARATUS, AND RECORDING MEDIUM COMPARING VERSIONS OF CIRCUIT DATA AND COPYING TO MATCH CIRCUIT DATA OF FIRST AND SECOND INTERFACES

(71) Applicant: FUJITSU LIMITED, Kawasaki-shi, Kanagawa (JP)

(72) Inventors: Masahiro Saitou, Kawasaki (JP); Yasushi Yoshino, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 14/273,699

(22) Filed: May 9, 2014

(65) Prior Publication Data

US 2014/0344537 A1    Nov. 20, 2014

(30) Foreign Application Priority Data

May 16, 2013    (JP) .................................. 2013-104546

(51) Int. Cl.

| G06F 13/00 | (2006.01) |
|---|---|
| H04M 7/00 | (2006.01) |
| G06F 13/40 | (2006.01) |
| H04J 3/04 | (2006.01) |
| H04L 12/40 | (2006.01) |
| H04J 3/16 | (2006.01) |

(52) U.S. Cl.
CPC .............. H04M 7/006 (2013.01); G06F 13/40 (2013.01); H04J 3/04 (2013.01); H04L 12/40 (2013.01); H04J 3/1611 (2013.01)

(58) Field of Classification Search
CPC ....... G06F 3/068; G06F 3/0619; G06F 3/065; G06F 13/40; H05K 1/0286; H05K 2201/10212; H04J 3/1611; H04J 3/04; H04L 41/082; H04L 41/0873; H04L 41/0893; H04L 12/40; H04M 2250/14; H04M 7/006
USPC ............ 710/13, 104, 301; 711/115, 164, 170; 713/2, 100; 717/168, 170
See application file for complete search history.

(56) References Cited

U.S. PATENT DOCUMENTS

| 7,376,719 | B1 * | 5/2008 | Shafer | H04L 41/082 709/203 |
|---|---|---|---|---|
| 7,539,807 | B2 * | 5/2009 | Sommer | G06F 1/263 710/104 |
| 7,660,923 | B2 * | 2/2010 | Schneider | G06F 13/409 326/101 |
| 2005/0076333 | A1 * | 4/2005 | Leclair | G06F 8/61 717/176 |
| 2007/0208926 | A1 * | 9/2007 | Grieve | G06F 9/4401 713/1 |
| 2008/0225882 | A1 | 9/2008 | Atsumi et al. | |

FOREIGN PATENT DOCUMENTS

| JP | 2002-314579 | 10/2002 |
|---|---|---|
| JP | 2008-227993 | 9/2008 |

* cited by examiner

*Primary Examiner* — Hong Kim
(74) *Attorney, Agent, or Firm* — Staas & Halsey LLP

(57) ABSTRACT

A control method to be executed by a processor included in a transmission apparatus, the control method includes receiving, from a first interface device storing first circuit data, a first version of the first circuit data at a time of coupling of the first interface device to the transmission apparatus; extracting, from a plurality of interface devices included in the transmission apparatus, second circuit data of a second interface device storing the second circuit data, where a second interface device type is a same as a first interface device type, when the second interface device exists in the plurality of interface devices and when the first version matches a second version stored in a memory, the second version being associated with the second interface device type of the second version stored in the memory; and copying the second circuit data to the first interface device.

12 Claims, 20 Drawing Sheets

FIG. 3

| SLOT NUMBER | CARD TYPE | DATA VERSION |
|---|---|---|
| 1 | TYPE A | 3 |
| 2 | TYPE B | 2 |
| 3 | TYPE C | 4 |
| 4 | TYPE D | 2 |
| 5 | – | – |
| ⋮ | ⋮ | ⋮ |

FIG. 4

| CARD TYPE | DATA LATEST VERSION |
|---|---|
| TYPE A | 3 |
| TYPE B | 2 |
| TYPE C | 4 |
| TYPE D | 2 |

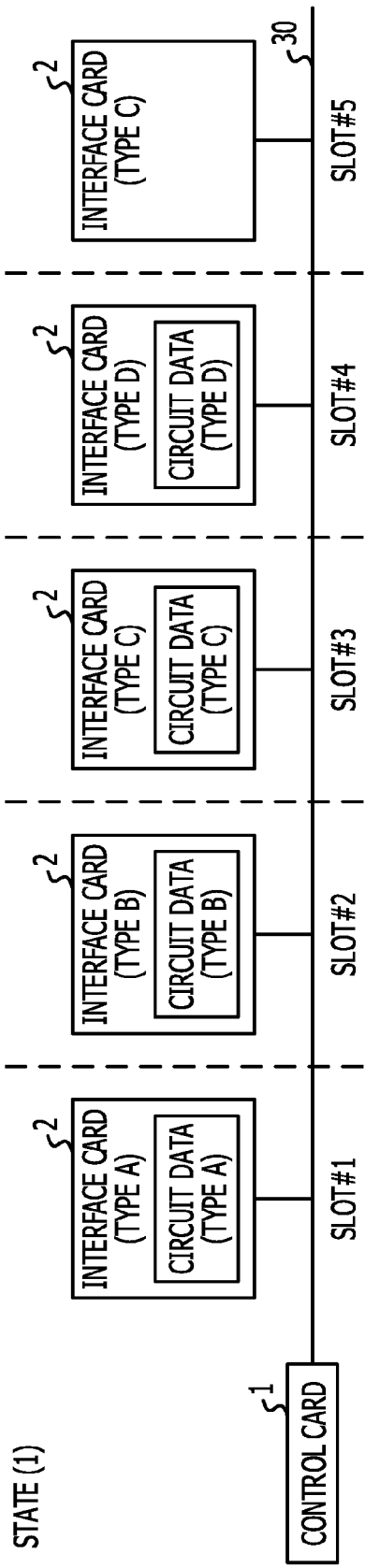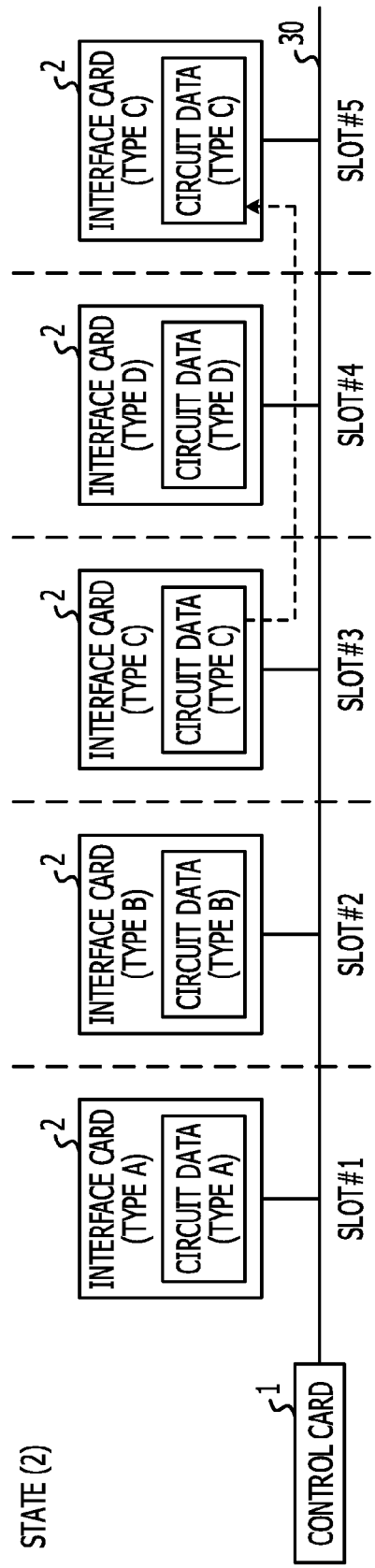

FIG. 9

| SLOT NUMBER | CARD TYPE | DATA VERSION | BACKUP DATA TYPE | BACKUP DATA VERSION |
|---|---|---|---|---|
| 1 | TYPE A | 3 | TYPE B | 2 |
| 2 | TYPE B | 2 | TYPE C | 4 |
| 3 | TYPE C | 4 | TYPE D | 2 |
| 4 | TYPE D | 2 | TYPE A | 3 |
| 5 | – | – | – | – |
| ⋮ | ⋮ | ⋮ | ⋮ | ⋮ |

CONTROL METHOD, TRANSMISSION APPARATUS, AND RECORDING MEDIUM COMPARING VERSIONS OF CIRCUIT DATA AND COPYING TO MATCH CIRCUIT DATA OF FIRST AND SECOND INTERFACES

CROSS-REFERENCE TO RELATED APPLICATIONS

This application is based upon and claims the benefit of priority of the prior Japanese Patent Application No. 2013-104546 filed on May 16, 2013, the entire contents of which are incorporated herein by reference.

FIELD

The embodiments discussed herein are related to a control method, a transmission apparatus, and a recording medium.

BACKGROUND

With increasing demands for communication, transmission apparatuses that are capable of performing high-speed transmission at 10 to 100 Gbps have been in widespread use. Each transmission apparatus includes interface cards for performing processing for transmitting main signals and a control card for controlling the interface cards. The interface cards and the control card are mounted in respective slots provided in a rack, which is a housing for the transmission apparatus.

Multiple types of interface card are available depending on the format of the main signals to be processed, the number of ports, a transmission capacity per port, and a hardware configuration (for example, a variation resulting from production discontinuation or modification of electronic components included in each interface card). Examples of the format of the main signals include formats based on SONET/SDH (Synchronous Optical NETwork/Synchronous Digital Hierarchy) and Ethernet (registered trademark).

The interface cards are equipped with field programmable gate arrays (FPGAs) that realize functions according to the aforementioned types. The FPGAs are devices in which a circuit is formed for operation through configuration according to circuit data stored in an external memory. Even for interface cards having the same function, there are cases in which the types of FPGA included in the interface cards are different from each other. This is because, upon production discontinuation or modification of the FPGAs, the design of the interface cards is changed and thus the FPGAs are replaced with other variants.

The circuit data for each FPGA is modified, for example, in order to add a function. Thus, circuit data for each interface card in operation in a communication service is updated, each time a function is added. When the circuit data is updated, the interface card obtains the circuit data from the control card through communication within the transmission apparatus. The control card downloads the circuit data for the FPGA from a data center (for example, a network management apparatus) through a communication line for monitor and control and causes the downloaded circuit data to be stored in a storage device, such as a memory, provided in the control card.

The speed (for example, 128 kbps) of a communication line for monitor and control is low. Thus, if download is executed each time the circuit data is to be updated, it takes a large amount of time. Accordingly, the control card downloads and holds pieces of circuit data for all types of interface card from the data center in advance, and sends the circuit data to the interface cards, each time update processing for the circuit data is performed. Since the communication speed (for example, 100 (Mbps)) of communication within the transmission apparatus is higher than the speed of the communication line for monitor and control, the time taken for updating the circuit data is reduced, and consequently, the time until a communication service is started is also reduced.

For example, Japanese Laid-open Patent Publication No. 2002-314579 discloses a communication apparatus having FPGAs for converting data into formats corresponding to various forms of processing. Japanese Laid-open Patent Publication No. 2008-227993 discloses a transmission apparatus having an FPGA in a signal processing unit for performing signal processing.

For example, according to advancement in the technologies and diversification of communication services, the number of types of interface card is increasing, and correspondingly, the number of types of circuit data is also increasing. However, the storage capacity of the storage device included in the control card is finite. Thus, there is also a concern that an increase in the number of types of circuit data results in a shortage of the storage capacity in the future.

To address the concern, it is conceivable to increase the storage capacity of the storage device. However, since an increase in the storage capacity involves changes to the hardware, the design of the control cards may be changed. Thus, when a new type of interface card is added, a problem arises in that the control card that is already in operation is to be replaced with a new control resulting from the design change. Such a problem is not only limited to the circuit data in the FPGAs but is also found in other types of data (such as program data).

SUMMARY

According to an aspect of the invention, a control method to be executed by a processor included in a transmission apparatus, the control method includes receiving, from a first interface device storing first circuit data, a first version of the first circuit data at a time of coupling of the first interface device to the transmission apparatus; extracting, from a plurality of interface devices included in the transmission apparatus, second circuit data of a second interface device storing the second circuit data, where a second interface device type is a same as a first interface device type, when the second interface device exists in the plurality of interface devices and when the first version matches a second version stored in a memory, the second version being associated with the second interface device type of the second version stored in the memory; and copying the second circuit data to the first interface device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of the contents of a card management table;

FIG. 4 illustrates an example of the contents of a version management table;

FIGS. 5A and 5B illustrate an operation when an interface card is mounted in a first embodiment;

FIG. 9 illustrates an example of the card management table in the second embodiment;

DESCRIPTION OF EMBODIMENTS

Figure 1:
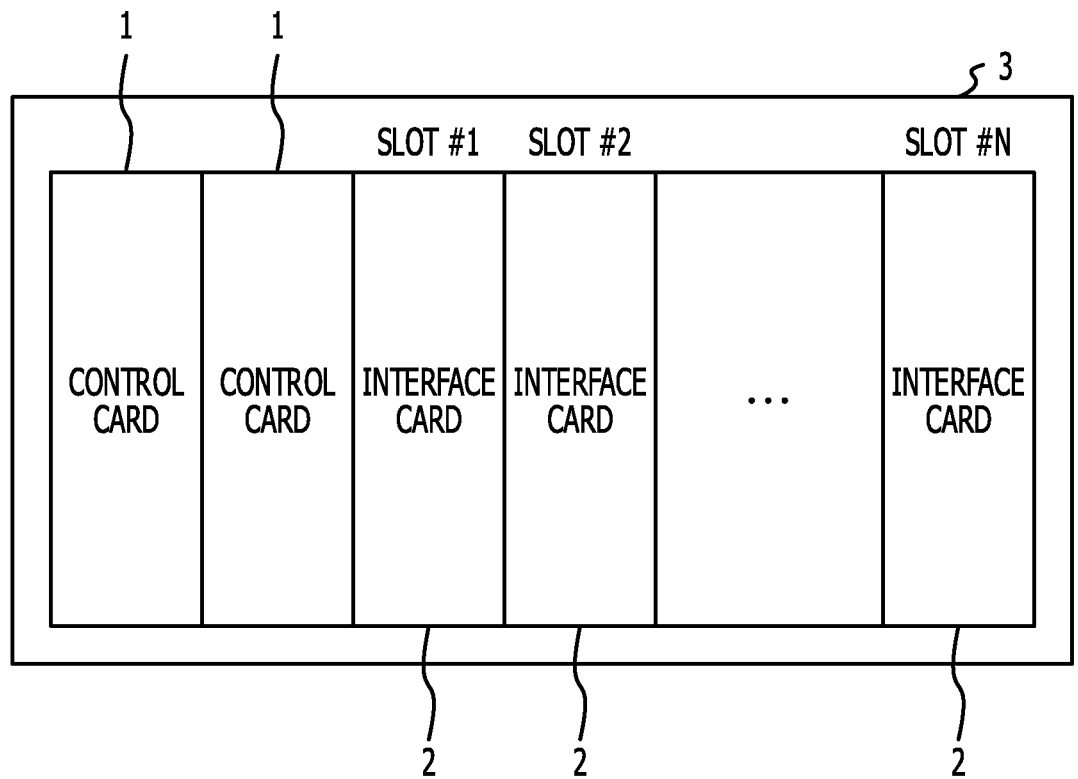
FIG. 1 is a front view of a transmission apparatus according to an embodiment.

FIG. 1 is a front view of a transmission apparatus according to an embodiment. The transmission apparatus is connected to a network to transmit a main signal, for example, at 10 to 100 Gbps.

The transmission apparatus includes a cuboid-shaped rack 3, which serves as a housing, a pair of control cards (control units) 1, and interface cards (transmission processing units) 2. The rack 3 accommodates the control cards 1 and the interface cards 2. The control cards 1 and the interface cards 2 are electronic circuit boards, each including electronic components. In the transmission apparatus, the control cards 1 and the interface cards 2 may also have a shape other than a card shape.

The interface cards 2 are removable provided in the rack 3 and perform processing for transmitting main signals. The interface cards 2 are mounted in any of slots #1 to #N provided in a front surface of the rack 3 and are electrically connected with the control circuits 1 and the other interface cards 2 through a substrate on a back surface of the rack 3. The mounting positions of the interface cards 2, that is, slot numbers (#1 to #N (N is a natural number)), are not restricted by the types of interface card 2.

Multiple types of interface card 2 are available depending on the format of a main signal to be processed, a hardware configuration, and so on. Examples of the format of the main signal include SONET/SDH, Ethernet (registered trademark), and so on. The hardware configuration refers to, for example, a variation resulting from production disconsolation or modification of the electronic components included in the interface card 2.

The control cards 1 are removably provided in the rack 3, detect mounting/removal of the interface cards 2, and control the interface cards 2. The control cards 1 are mounted in other slots provided in the rack 3. One of the control cards 1 is electrically connected with the other one of the control circuits 1 and the interface cards 2 through the substrate on the back surface of the rack 3. The mounting positions of the control cards 1, that is, the slot numbers, are fixed. In FIG. 1, the slots for the control cards 1 are located at an edge portion of the rack 3, but may also be located at a center portion thereof.

One of the paired control cards 1 is used as a working system, and the other control card 1 is used as a backup system. When the working control card 1 fails, the backup control card 1 is switched to serve as a working control card 1. Since the configurations and operations of the pair of control cards 1 are substantially the same, one of the control cards 1 will be described below.

Figure 2:
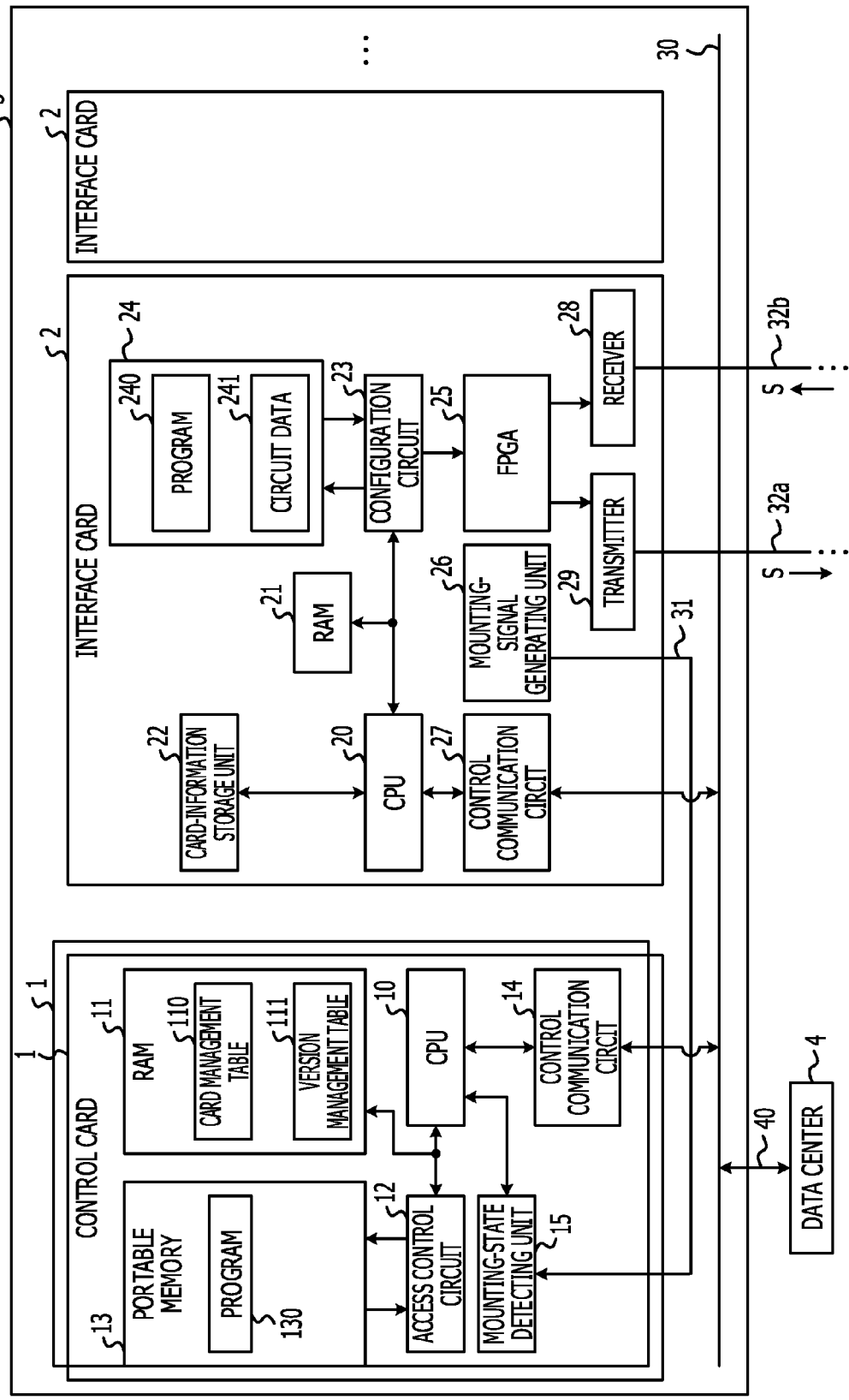
FIG. 2 is a block diagram illustrating the functional configuration of the transmission apparatus.

FIG. 2 is a block diagram illustrating the functional configuration of the transmission apparatus. The interface card 2 includes a central processing unit (CPU) 20, a random access memory (RAM) 21, a card-information storage unit 22, a configuration circuit 23, and a flash memory 24. The interface card 2 further includes an FPGA 25, a mounting-signal generating unit 26, a control communication circuit 27, a receiver 28, and a transmitter 29.

The CPU 20 controls the operation of the interface card 2. The CPU 20 reads a program 240, stored in the flash memory 24, via the configuration circuit 23 connected to a data bus for the CPU 20 and executes a predetermined operation. In this case, the RAM 21 functions as a working memory. The interface card 2 may also have another processor, instead of the CPU 20. The program 240 may also be stored in another nonvolatile memory, instead of the flash memory 24.

The CPU 20 communicates with the control cards 1 via the control communication circuit 27. The control communication circuit 27 is connected with a bus line 30, disposed on the substrate on the back surface of the rack 3, to perform communication processing. The bus line 30 may also be replaced with a line for a local area network (LAN).

The card-information storage unit 22 is, for example, an electrically erasable programmable read-only memory (EEPROM). The card-information storage unit 22 stores therein card information indicating the type of interface card 2. Upon receiving a request from the control card 1, the CPU 20 reads the card information indicating the type of the control card 1 from the card-information storage unit 22 and sends the read card information to the control card 1.

When the interface card 2 is powered on, that is, is mounted, or when the control card 1 issues a reconfiguration instruction, the configuration circuit 23 reads circuit data 241 from the flash memory 24. The configuration circuit 23 loads the read circuit data 241 into the FPGA 25 to thereby configure a circuit in the FPGA 25.

The FPGA 25 is a logical device that is programmable based on the circuit data 241. The FPGA 25 has a circuit configured based on the circuit data 241 and performs main-signal transmission processing and so on. The circuit data 241 is relevant to the transmission processing and corresponds to the type of the interface card 2. That is, the circuit data 241 is unique data corresponding to the type of the interface card 2. The interface card 2 may also have another programmable logical device, instead of the FPGA 25.

The FPGA 25 is connected with the transmitter 29 and the receiver 28. The transmitter 29 is a light-emitting device (LED), such as a laser-emitting diode (LED). The transmitter 29 is connected with a transmission path 32a to transmit a main signal S to the transmission path 32a in accordance with an input signal from the FPGA 25. The receiver 28 is a light-receiving device, such as a photodetector (PD). The receiver 28 is connected with a transmission path 32b to receive a main signal S from the transmission path 32b and outputs the received main signal S to the FPGA 25.

When the interface card 2 is mounted, the mounting-signal generating unit 26 outputs a mounting-notification signal to the control card 1 via a mounting-detection line 31 provided on the substrate on the back surface of the rack 3. The mounting-notification signal is generated as, for example, a voltage signal having a predetermined value or greater. The mounting-detection line 31 is provided for each slot.

On the other hand, the control card 1 includes a CPU 10, a RAM 11, an access control circuit 12, a portable memory 13, a control communication circuit 14, and a mounting-state detecting unit 15.

The CPU 10 controls the operation of the control card 1. The access control circuit 12 controls write processing and read processing that the CPU 10 performs on the portable memory 13. The CPU 10 reads a program 130, stored in the portable memory 13, via the access control circuit 12 connected to a data bus for the CPU 10 and executes a predetermined operation. In this case, the RAM 11 functions as a working memory. The control card 1 may have another processor, instead of the CPU 10.

The portable memory 13 is, but is not limited to, a compact flash (registered trademark) memory, for example, and may also be another memory, such as a Secure Digital (SD) card. The portable memory 13 may be replaced with a non-portable nonvolatile memory.

The CPU 10 communicates with the interface cards 2 via the control communication circuit 14. The control communication circuit 14 is connected with the bus line 30 disposed on the substrate on the back surface of the rack 3 to perform communication processing. In accordance with predetermined processing, the CPU 10 sends a request or instruction to the CPU 20 in each interface card 2 and receives a response from the CPU 20.

The mounting-state detecting unit 15 detects the mounting states of the respective interface cards 2 in the slots #1 to #N through the corresponding mounting-detection lines 31. Upon receiving the mounting-notification signal, the mounting-state detecting unit 15 detects that the interface card 2 is mounted in the corresponding slot. When no mounting-notification signal is received, the mounting-state detecting unit 15 detects that the interface card 2 is removed from the corresponding slot (that is, the state in which the slot has no interface card 2 in it).

The mounting-state detecting unit 15 is connected with the CPU 10 through, for example, a Peripheral Component Interconnect (PCI) bus. The CPU 10 obtains, from the mounting-state detecting unit 15, pieces of mounting information (indicating mounting or non-mounting) for the respective slots #1 to #N to thereby detect the mounting and removal of the interface cards 2.

Upon detecting that an interface card 2 is mounted, the CPU 10 issues, to the CPU 20 in the interface card 2, a request for card information and version information of the circuit data. In response to the request, the CPU 20 in the interface card 2 obtains the card information from the card-information storage unit 22 and sends the card information to the CPU 10 in the control card 1. The CPU 20 in the interface card 2 obtains the version information from a header of the circuit data 241 stored in the flash memory 24 and sends the version information to the CPU 10 in the control card 1.

Based on the card information and the version information received from the interface card 2, the CPU 10 updates a card management table 110 stored in the RAM 11. FIG. 3 illustrates an example of the contents of the card management table 110.

For the respective slot numbers (#1 to #N), the types ("card types") of the interface cards 2 that are mounted and the versions ("data versions") of the circuit data 241 held by the interface cards 2 are recorded in the card management table 110. Upon detecting that the interface card 2 is mounted, the CPU 10 updates the card type, based on the card information, and updates the data version, based on the version information.

In the example illustrated in FIG. 3, for example, type-A to type-D interface cards 2 are mounted in the slots #1 to #4. For example, the interface card 2 mounted in the slot #1 holds version "3" of the circuit data 241.

A card type and a data version for a slot #5 in which no interface card 2 is mounted, that is, for the slot having no interface card 2 in it, indicate null states ("-"). Upon detecting that the interface card 2 is removed, the CPU 10 updates the card type and the data version for the slot to null states ("-").

The RAM 11 stores therein a version management table 111. The latest versions of pieces of corresponding circuit data 241 for respective types of interface card 2 are recorded in the version management table 111. FIG. 4 illustrates an example of the contents of the version management table 111. In the example illustrated in FIG. 4, for example, the latest version of the circuit data 241 for the type-A interface card 2 is "3".

When the data version stored in the card management table 110 is not the latest version recorded in the version management table 111, the CPU 10 executes update processing by causing the circuit data 241 to be copied between the interface cards 2.

The CPU 10 downloads the version management table 111 and the circuit data 241 by communicating with a data center 4 through the bus line 30. The CPU 10 temporarily stores the downloaded circuit data 241 in the portable memory 13 and then sends the circuit data 241 to the interface card 2. The CPU 10 stores the downloaded version management table 111 in the RAM 11. The update of the version management table 111 is, for example, triggered by a notification from the data center 4.

The data center 4 has, for example, a network management apparatus. The data center 4 is connected with the bus line 30 in the transmission apparatus through a low-speed communication line 40. Communication-speed conversion processing and so on are performed between the communication line 40 and the bus line 30.

Suppose that, as in the system of the related technology described above, the CPU 10 in the control card 1 downloads the circuit data 241 for all of the types of interface card 2 from the data center 4 and stores the circuit data 241 in the portable memory 13. In this case, an increase in the number of types of circuit data 241 causes a problem in that the storage capacity of the portable memory 13 becomes insufficient.

First Embodiment

Accordingly, in the embodiment described below, the control card 1 performs control so that the circuit data 241 for the type of a newly mounted interface card 2 is copied from the interface card 2 that holds the circuit data 241 to the newly mounted interface card 2. Thus, the transmission apparatus according to the embodiment updates a large number of types of circuit data 241 without involving an increase in the storage capacity.

FIGS. 5A and 5B illustrate an operation when an interface card 2 according to a first embodiment is mounted. More specifically, FIGS. 5A and 5B illustrate an operation when a type-C interface card 2 is newly mounted in the slot #5 in a case in which type-A to type-D interface cards 2 have already been mounted in the slots #1 to #4.

FIGS. 5A and 5B illustrate the types (type A to type D) of the interface cards 2 and the types (type A to type D) of the circuit data 241 stored in the flash memories 24 in the interface cards 2. For example, the interface card 2 in the slot #1 holds the type-A circuit data 241 for the type (type A), and the interface card 2 in the slot #2 holds the type-B circuit data 241 for the type (B type). Since the interface card 2 newly mounted in the slot #5 holds an old version of the circuit data 241 (that is, the circuit data 241 that is not the latest version), the circuit data 241 for the interface card 2 is data to be updated.

FIGS. 5A and 5B illustrate states (1) and (2) when the interface card 2 is mounted in the slot #5, in accordance with a time sequence. In state (1), when the type-C interface card 2 is newly mounted in the slot #5, the CPU 10 in the control card 1 uses the mounting-state detecting unit 15 to detect the mounting of the interface card 2. The CPU 10 in the control card 1 then issues a request for the card information and the version information of the circuit data 241 to the CPU 20 in the interface card 2 and obtains a response thereto.

By referring to the version management table 111, the CPU 10 in the control card 1 determines that the circuit data 241 in the interface card 2 mounted in the slot #5 is not the latest version. By referring to the card management table 110, the CPU 10 in the control card 1 searches for, among the interface cards 2 in the other slots #1 to #4, the same type of interface card 2 as the type of the interface card 2 in the slot #5.

That is, the CPU 10 in the control card 1 searches for, among the interface cards 2 already mounted in the other slots #1 to #4, the interface card 2 that holds the circuit data 241 for the type (type C) of the interface card 2 newly mounted in the slot #5. In this example, the interface card 2 in the slot #3 is of the same type (type C) as the type of the interface card 2 in the slot #5, and is thus found as a matching interface card 2.

Next, in state (2), the CPU 10 in the control card 1 performs control so that the circuit data 241 is copied from the interface card 2 in the slot #3 to the interface card 2 in the slot #5. More specifically, the CPU 10 in the control card 1 issues an instruction to the CPU 20 in the interface card 2 in the slot #3 so as to send the circuit data 241 to the interface card 2 in the slot #5.

Upon receiving the instruction, the CPU 20 in the interface card 2 in the slot #3 reads the circuit data 241 from the flash memory 24 in accordance with a predetermined procedure and sends the circuit data 241 to the interface card 2 in the slot #5 through the bus line 30. Upon receiving the circuit data 241, the CPU 20 in the interface card 2 in the slot #5 checks an error and so on of the circuit data 241. When the circuit data 241 passes the check, the CPU 20 writes the circuit data 241 to the flash memory 24. As a result, the circuit data 241 in the interface card 2 in the slot #5 is updated.

When the update of the circuit data 241 is completed, the CPU 20 in the interface card 2 in the slot #5 sends a notification indicating the completion to the CPU 10 in the control card 1. Upon receiving the notification, the CPU 10 in the control card 1 issues an instruction to the interface card 2 in the slot #5 so as to execute reconfiguration of the FPGA 25.

Upon receiving the instruction, the CPU 20 in the interface card 2 in the slot #5 causes the configuration circuit 23 to execute reconfiguration of the FPGA 25. The reconfiguration may be performed, for example, by resetting the interface card 2. As a result, a circuit based on the latest version of the circuit data 241 is configured in the FPGA 25 in the interface card 2 in the slot #5 and operates.

Figure 6:
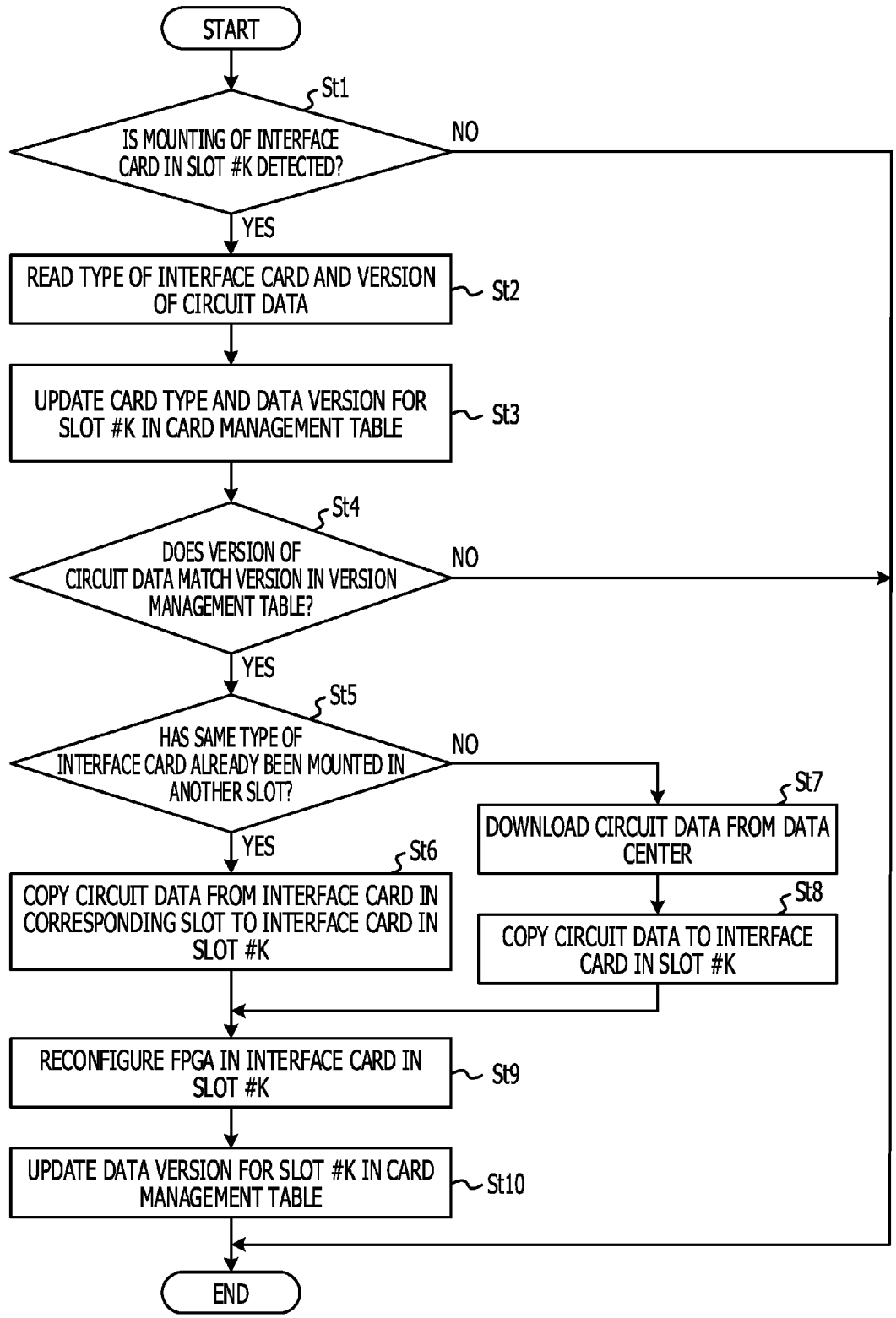
FIG. 6 is a flowchart illustrating processing when the interface card is mounted in the first embodiment.

FIG. 6 is a flowchart illustrating processing when the interface card 2 is mounted in the first embodiment. Upon detecting that the interface card 2 is newly mounted in a slot #K (K is a natural number) (YES in St1), the CPU 10 in the control card 1 executes a process in St2; otherwise (NO in St1), the CPU ends the processing.

The CPU 10 reads the type of the interface card 2 and the version of the circuit data 241 from the interface card 2 (St2). That is, the CPU 10 obtains the card information and the version information from the interface card 2.

Next, based on the read type of the interface card 2 and the version of the circuit data 241, the CPU 10 updates the card type and the data version for the slot #K in the card management table 110 (St3). Next, with respect to the slot #K, the CPU 10 compares the version of the circuit data 241 with the version in the version management table 111 (St4). Through the comparison, the CPU 10 determines whether or not the circuit data 241 for the slot #K is the latest version.

When the result of the comparison indicates that the version of the circuit data 241 matches the version in the version management table 111 (YES in St4), the CPU 10 determines that update of the circuit data 241 for the slot #K may be omitted and ends the processing. On the other hand, when the result of the comparison indicates that the version of the circuit data 241 does not match the version in the version management table 111 (NO in St4), the CPU 10 determines that the circuit data 241 for the slot #K is to be updated and executes a process in St5.

Based on the card management table 110, the CPU 10 determines whether or not the same type of interface card 2 as the type of the interface card 2 in the slot #K has already been mounted in another slot (St5). When the same type of interface card 2 has already been mounted (YES in St5), the CPU 10 executes a process in St6.

In this case, the CPU 10 performs control so that the circuit data 241 is copied from the interface card 2 in the corresponding slot to the interface card 2 in the slot #K (St6). As a result, the circuit data 241 stored in the flash memory 24 is updated in the interface card 2 in the slot #K.

On the other hand, when the same type of interface card 2 has not been mounted yet (NO in St5), the CPU 10 executes a process in St7. In this case, the CPU 10 downloads, from the data center 4, the circuit data 241 for the type of the interface card 2 in the slot #K (St7). Next, the CPU 10 copies the downloaded circuit data 241 to the interface card 2 in the slot #K (St8). As a result, the circuit data 241 stored in the flash memory 24 is updated in the interface card 2 in the slot #K.

Next, the CPU 10 performs control so as to reconfigure the FPGA 25 in the interface card 2 in the slot #K (St9). As a result, the configuration circuit 23 in the interface card 2 in the slot #K reconfigures the FPGA 25, based on the updated circuit data 241.

Next, the CPU 10 updates the data version for the slot #K in the card management table 110 to the latest version (St10). The processing when an interface card 2 is mounted is performed as described above.

Figure 7:
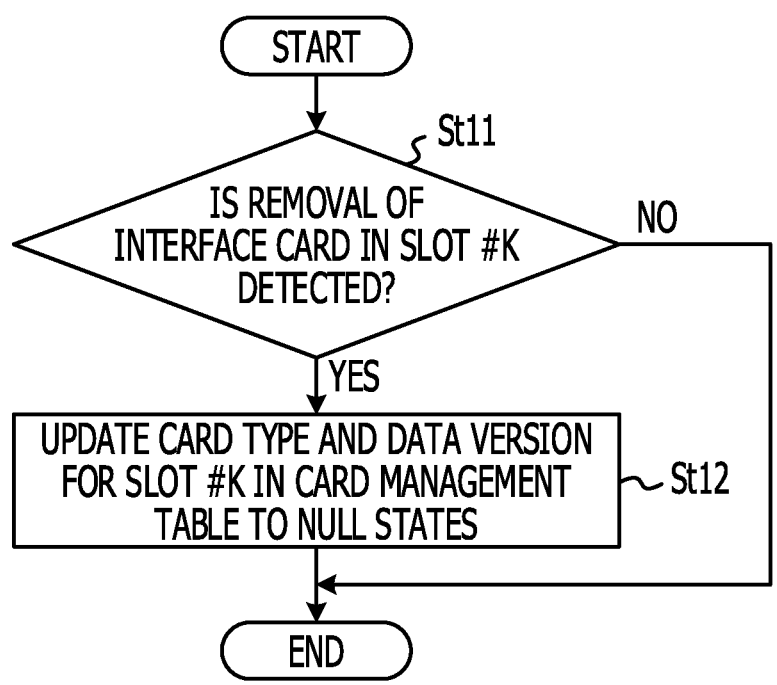
FIG. 7 is a flowchart illustrating processing when the interface card is removed in the first embodiment.

FIG. 7 is a flowchart illustrating processing when the interface card 2 is removed in the first embodiment. Upon detecting that the interface card 2 in the slot #K is removed (YES in St11), the CPU 10 in the control card 1 executes a process in St12; otherwise (NO in St11), the CPU 10 ends the processing.

In St12, the CPU 10 updates the card type and the data version for the slot #K in the card management table 110 to null states (that is, "-" in FIG. 3) and ends the processing. The processing when the interface card 2 is removed is performed as described above.

In the present embodiment, the interface cards 2 hold the circuit data 241 regarding transmission processing and corresponding to the types of the local interface cards 2. Upon detecting that the interface card 2 is newly mounted, the control card 1 performs control so that the circuit data 241 is copied from the same type of the interface card 2 among the already mounted interface cards 2 to the newly mounted interface card 2.

Thus, the update of the circuit data 241 in the interface card 2 is performed by copying the circuit data 241 held by another interface card 2. Accordingly, the control card 1 may or may not store, in the portable memory 13, the circuit data 241 for all of the types of interface card 2. Since the circuit data 241 is copied through the bus line 30, the copying is completed at higher speed than in a case in which the circuit data 241 is downloaded from the data center 4. Thus, the transmission apparatus according to the present embodiment allows a large number of types of data to be updated without an increase in the storage capacity.

Second Embodiment

Although each interface card 2 holds only the circuit data 241 for the type of the local interface card 2, each interface card 2 may also hold backup circuit data 241 for another interface card 2.

Figure 8:
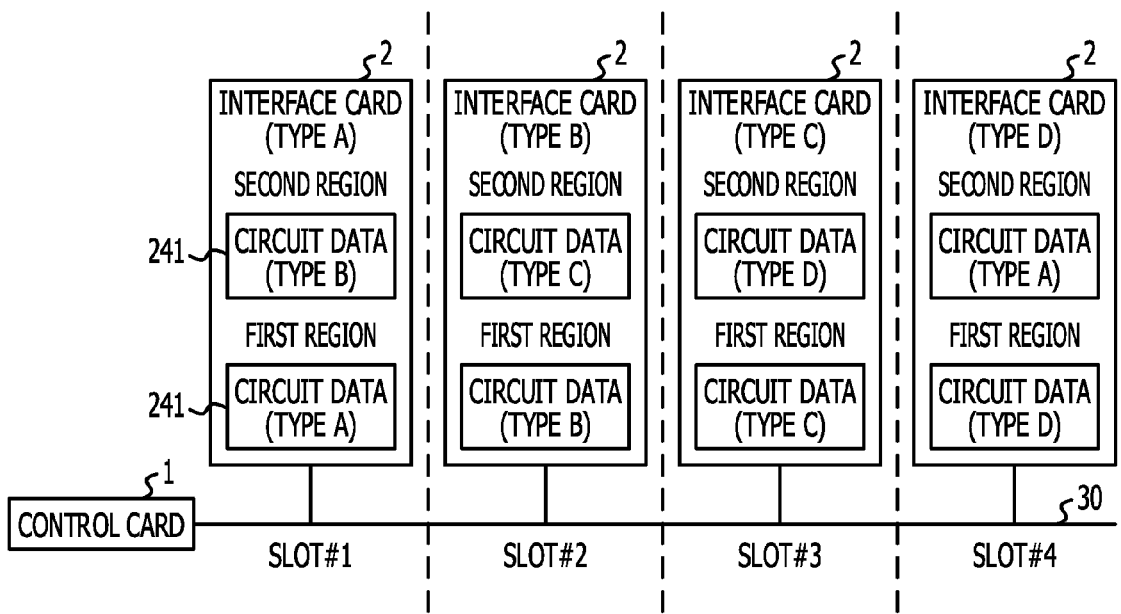
FIG. 8 illustrates a state in which circuit data is held in a second embodiment.

FIG. 8 illustrates a state in which the circuit data 241 is held in a second embodiment. FIG. 8 illustrates the types (type A to type D) of the interface cards 2 and the types (type A to type D) of pieces of circuit data 241 stored in first regions and second regions in the flash memories 24 in the interface cards 2.

In the present embodiment, each flash memory 24 has a first region (a first storage unit) and a second region (a second storage unit) in which respective pieces of circuit data 241 are stored. The first region and the second region are not limited to those provided in the same flash memory 24 but may also be provided in individual flash memories 24.

The first region stores therein the circuit data 241 for the type of the local interface card 2 among the plurality of interface cards 2. In the example in FIG. 8, since the interface card 2 in the slot #1 is type A, the type-A circuit data 241 is stored in the first region. Since the interface card 2 in the slot #2 is type B, the type-B circuit data 241 is stored in the first region.

The second region stores therein the circuit data 241 for another type of interface card 2 among the plurality of interface cards 2. More specifically, the second region stores therein the circuit data 241 for the type of another interface card 2 determined according to the mounting position of the local interface card 2 among the plurality of interface cards 2, that is, determined according to the slot of the local interface card 2.

In the example in FIG. 8, the second region in the flash memory 24 in each interface card 2 stores therein the circuit data 241 for the type of interface card 2 having the next largest slot number after the slot number of the local interface card 2. For example, the second region in the flash memory 24 in the interface card 2 in the slot #1 stores therein the circuit data 241 for the type of the interface card 2 in the slot #2. The second region in the flash memory 24 in the interface card 2 in the slot #2 stores the circuit data 241 for the type of the interface card 2 in the slot #3.

When no interface card 2 is mounted in the corresponding slot, the second region in the flash memory 24 stores therein the same circuit data 241 as the circuit data 241 in the interface card 2 mounted in the slot with the next slot number in ascending order. In the example in FIG. 8, if the slot #2 has no interface card 2 in it, the second region in the flash memory 24 in the interface card 2 in the slot #1 stores therein the circuit data 241 for the interface card 2 in the slot #3.

With respect to the interface card 2 mounted in the slot with the largest slot number, the second region in the flash memory 24 stores therein the circuit data 241 for the type of the interface card 2 mounted in the slot with the smallest slot number. In the example in FIG. 8, the second region in the flash memory 24 in the interface card 2 in the slot #4 stores therein the type-A circuit data 241 for the type (type A) of the interface card 2 in the slot #1.

Each interface card 2 stores, in the second region in the flash memory 24, the circuit data 241 for the type of another interface card 2, the type being determined according to the slot at the mounting position. This allows the control card 1 to easily manage the circuit data 241 in the second region.

Each interface card 2 holds two types of circuit data 241, that is, the circuit data 241 for the type of the local interface card 2 and the circuit data 241 for another interface card 2. Accordingly, each interface card 2 manages information on each piece of circuit data 241 by using the card management table 110. FIG. 9 illustrates an example of the card management table in the second embodiment. A "card type" and a "data version" in this case are analogous to those described above.

The "backup data type" indicates the type (type A to type D) of circuit data 241 for the type of another interface card 2. The "backup data version" indicates the version of the circuit data 241 for the type of interface card 2. The example in FIG. 9 corresponds to the state illustrated in FIG. 8.

Figure 10A:
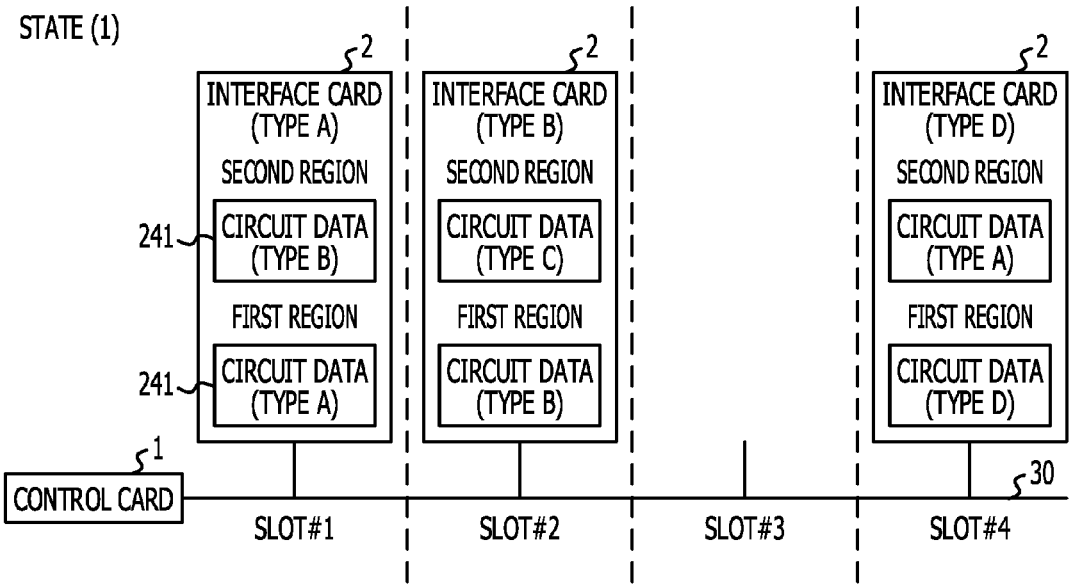
FIGS. 10A and 10B illustrate an operation when the interface card is removed in the second embodiment.
Figure 10B:
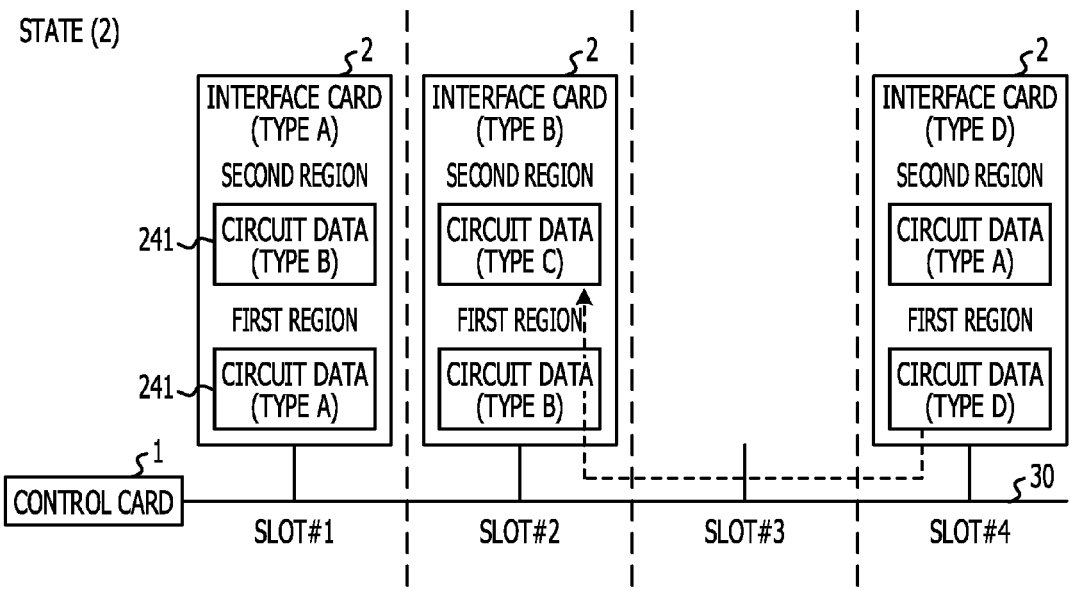
Figure 11A:
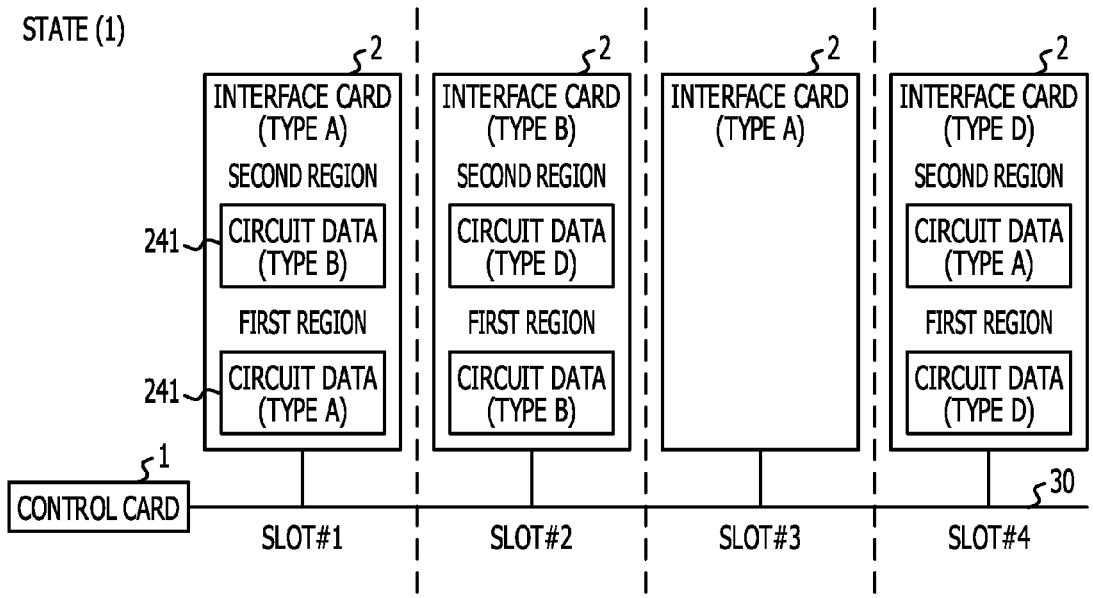
FIGS. 11A, 11B, 11C, and 11D illustrate an operation when an interface card is mounted in the second embodiment.
Figure 11B:
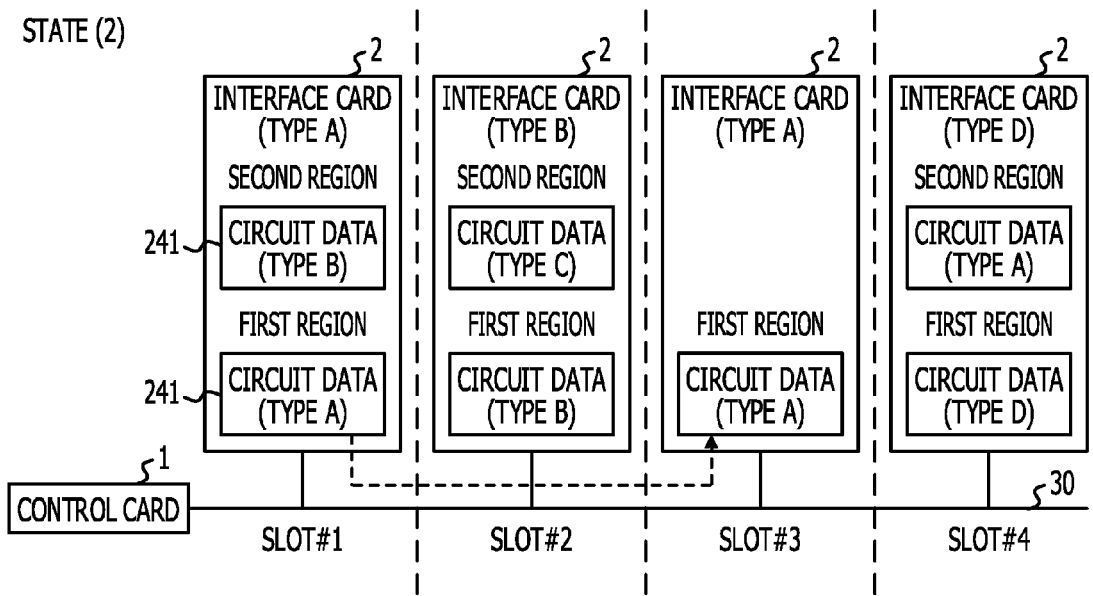
Figure 11C:
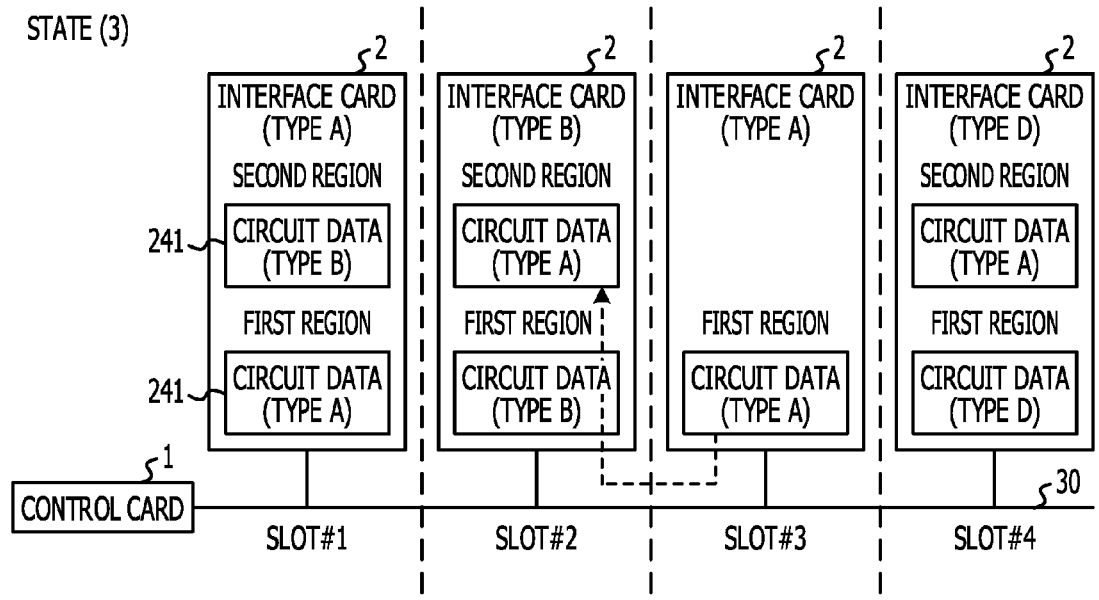
Figure 11D:
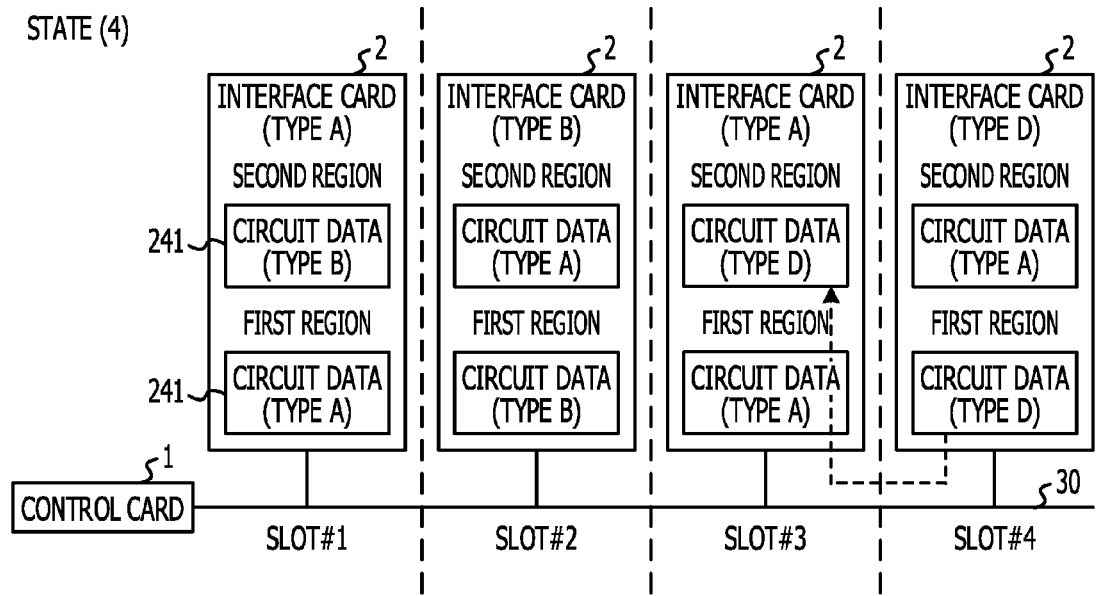

FIGS. 10A and 10B illustrate an operation when the interface card 2 is removed in the second embodiment. FIGS. 10A and 10B illustrate states (1) and (2) after the interface card 2 in the slot #3 is removed in the state illustrated in FIG. 8, in accordance with a time sequence.

First, in state (1), upon detecting that the interface card 2 in the slot #3 is removed, the CPU 10 in the control card 1 updates information regarding the slot #3 in the card management table 110. That is, the CPU 10 updates the "card type" and the "data version" for the card #3 to null states ("-").

Next, in state (2), the CPU 10 in the control card 1 searches for the slot number #2 that is the next smallest number after the slot number of the slot #3 from which the interface card 2 was removed. The CPU 10 in the control card 1 searches for the slot number #4 that is the next largest number after the slot number of the slot #3 from which the interface card 2 was removed.

The CPU 10 in the control card 1 then performs control so that the circuit data 241 is copied from the first region in the flash memory 24 in the interface card 2 in the slot #4 to the second region in the flash memory 24 in the interface card 2 in the slot #2. The procedure for the copy processing is substantially the same as that described above with reference to FIGS. 5A and 5B.

In this case, the type-C circuit data 241 that has originally been stored in the second region in the flash memory 24 in the interface card 2 in the slot #2 is overwritten with the type-D circuit data 241. As a result, the backup circuit data 241 for the interface card 2 in the slot #4 is held in the interface card 2 in the slot #2.

In such a manner, upon detecting that any of the interface cards 2 is removed, the control card 1 selects two slots among the slots in which the remaining interface cards 2 are mounted, in accordance with the slot number of the slot from which the interface card 2 was removed. The control card 1 then performs control so that the circuit data 241 is copied from the first region in one of the interface cards 2 mounted in the selected slots to the second region in the interface card 2 mounted in the other one of the selected slots. As a result, after the interface card 2 is removed, a redundant configuration of the circuit data 241, like that illustrated in FIG. 8, is formed again.

FIGS. 11A, 11B, 11C, and 11D illustrate an operation when an interface card 2 is mounted in the second embodiment. FIGS. 11A, 11B, 11C, and 11D illustrate states (1) to (4), respectively, after a type-A interface card 2 is mounted in the slot #3 in the state illustrated in FIG. 10B, in accordance with a time sequence.

First, in state (1), upon detecting that the type-A interface card 2 is mounted in the slot #3, the CPU 10 in the control card 1 updates information regarding the slot #3 in the card management table 110. It is assumed that circuit data 241 in the interface card 2 in the slot #3 is not the latest version.

The CPU 10 in the control card 1 searches for, among the interface cards 2 already mounted in the other slots #1, #2, and #4, the interface card 2 that holds the type-A circuit data 241 for the type (type A) of the interface card 2 newly mounted in the slot #3. More specifically, the CPU 10 in the control card 1 searches for, in the other slots #1, #2, and #4, the same type of interface card 2 as the type of the interface card 2 newly mounted in the slot #3.

In this example, the interface card 2 in the slot #1 is of the same type (type A) as the interface card 2 in the slot #3, and is thus found as a matching interface card 2. In this case, for example, when the interface card 2 in the slot #3 is not working properly, the CPU 10 in the control card 1 may search for the interface card 2 in the slot #4, the type-A backup data being stored in the second region in the interface card 2.

Next, in state (2), the CPU 10 in the control card 1 performs control so that the circuit data 241 is copied from the first region in the flash memory 24 in the interface card 2 in the slot #1 to the first region in the interface card 2 in the slot #3. As a result, the circuit data 241 in the first region in the interface card 2 in the slot #3 is updated. The procedure for the copy processing is analogous to that described above with reference to FIGS. 5A and 5B.

Next, in state (3), the CPU 10 in the control card 1 searches for the slot number #2, which is the next smallest slot number after the slot number of the slot #3 in which the interface card 2 is mounted. The CPU 10 in the control card 1 performs control so that the circuit data 241 is copied from the first region in the flash memory 24 in the interface card 2 in the slot #3 to the second region in the flash memory 24 in the interface card 2 in the slot #2.

In this case, the type-D circuit data 241 that has originally been stored in the second region in the flash memory 24 in the interface card 2 in the slot #2 is overwritten with the type-A circuit data 241. As a result, the backup circuit data 241 for the type of the interface card 2 in the slot #3 is held in the interface card 2 in the slot #2.

Next, in state (4), the CPU 10 in the control card 1 searches for the slot number #4, which is the next largest slot number after the slot number of the slot #3 in which the interface card 2 is mounted. The CPU 10 in the control card 1 then performs control so that the circuit data 241 is copied from the first region in the flash memory 24 in the interface card 2 in the slot #4 to the second region in the flash memory 24 in the interface card 2 in the slot #3. As a result, the backup circuit data 241 for the type of the interface card 2 in the slot #4 is held in the interface card 2 in the slot #3.

As described above, upon detecting that an interface card 2 is newly mounted, the control card 1 selects two slots in which the interface cards 2 are mounted, in accordance with the slot number of the mounted interface card 2. The control card 1 then performs control so that the circuit data 241 is copied from the first region in the newly mounted interface card 2 to the second region in the interface card 2 mounted in one of the selected two slots. The control card 1 also performs control so that the circuit data 241 is copied from the first region in the interface card 2 mounted in the other one of the selected two slots to the second region in the newly mounted interface card 2. Thus, after the interface card 2 is mounted, the redundant configuration of the circuit data 241, like that illustrated in FIG. 8, is formed again.

Figure 12:
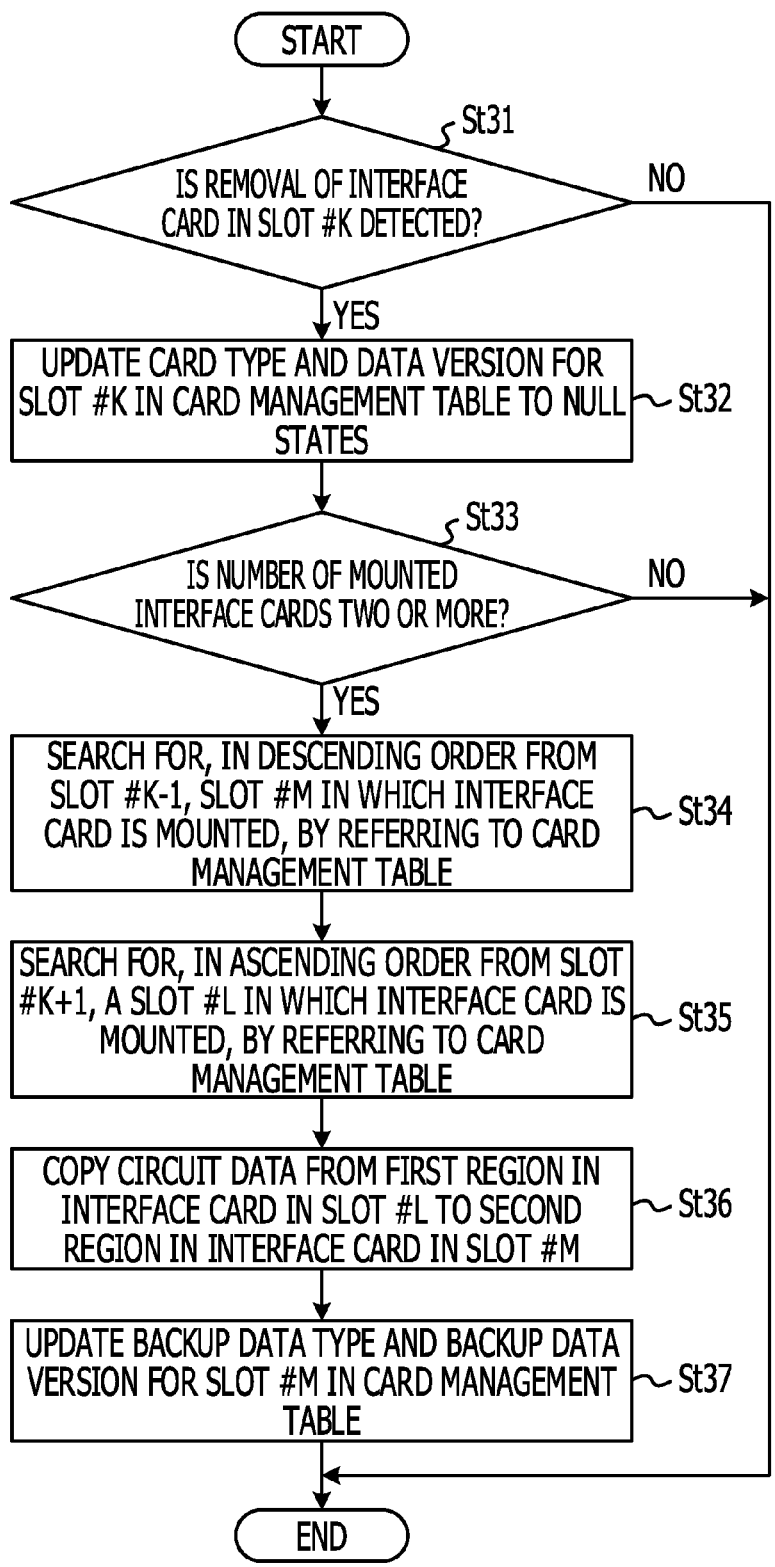
FIG. 12 is a flowchart illustrating processing when the interface card is removed in the second embodiment.

FIG. 12 is a flowchart illustrating processing when the interface card 2 is removed in the second embodiment. Upon detecting that the interface card 2 in the slot #K is removed (YES in St31), the CPU 10 in the control card 1 executes a process in St32; otherwise (NO in St31), the CPU 10 ends the processing.

The CPU 10 updates the card type and the data version for the slot #K in the card management table 110 to null states (that is, "-" in FIG. 3) (St32). Next, by referring to the card management table 110, the CPU 10 determines whether or not the number of mounted interface cards 2 is two or more (St33). When the number of interface cards 2 is two or more (YES in St33), the CPU 10 executes a process in St34; otherwise (NO in St33), the CPU 10 ends the processing.

By referring to the card management table 110, the CPU 10 searches for, in descending order from the slot #K−1, the slot #M in which the interface card 2 is mounted (St34). When the slot number K is the smallest number among the slots, the CPU 10 performs searching in descending order from the slot with the largest number. When no interface card 2 is mounted in the slot whose slot number is smaller than K, the CPU 10 performs searching in descending order from the slot with the largest number.

Next, by referring to the card management table 110, the CPU 10 searches for, in ascending order from the slot #K+1, a slot #L in which the interface card 2 is mounted (St35). When the slot number K is the largest number among the slots, the CPU 10 performs searching in ascending order from the slot with the smallest number. When no interface card 2 is mounted in the slot whose slot number is larger than K, the CPU 10 also performs searching in ascending order from the slot with the smallest number. The process in St35 may also be executed prior to the process in St34.

Next, the CPU 10 performs control so that the circuit data 241 is copied from the first region in the flash memory 24 in the interface card 2 in the slot #L to the second region in the flash memory 24 in the interface card 2 in the slot #M (St36). As a result, a redundant configuration of the circuit data 241 is formed.

Next, the CPU 10 updates the backup data type and the backup data version for the slot #M in the card management table 110 (St37). The processing when the interface card 2 is removed is performed as described above.

Figure 13:
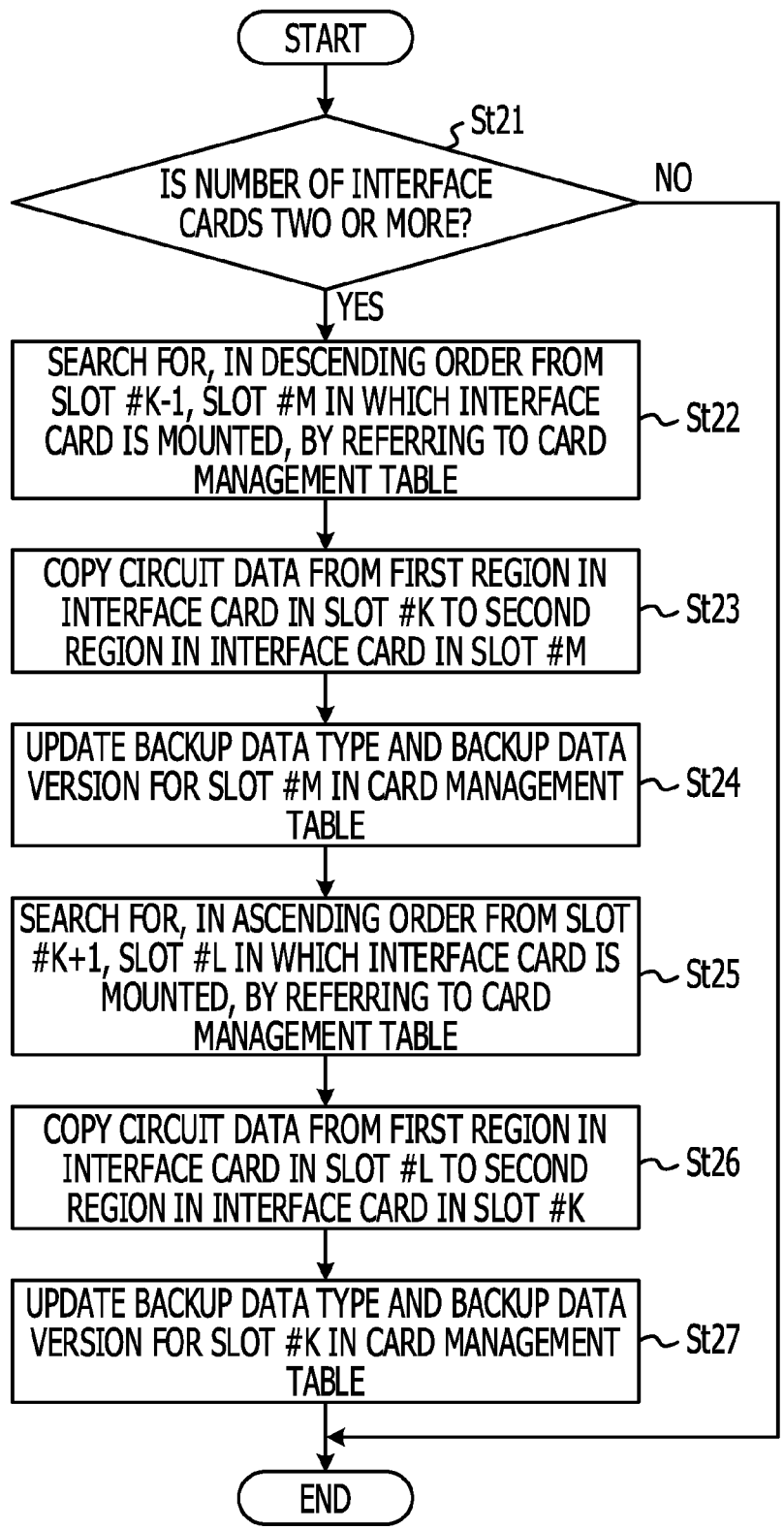
FIG. 13 is a flowchart illustrating processing when an interface card is mounted in the second embodiment.

FIG. 13 is a flowchart illustrating processing when an interface card 2 is mounted in the second embodiment. In the present embodiment, the processing for updating the circuit data 241 in the first region in a newly mounted interface card 2 is substantially the same as that in the first embodiment, as described with reference to FIG. 10B. Thus, the processing for updating the circuit data 241 is analogous to that illustrated in the flowchart in FIG. 6. FIG. 13 illustrates processing executed after the update processing is completed.

By referring to the card management table 110, the CPU 10 in the control card 1 determines whether or not the number of interface cards 2 is two or more (St21). When the number of mounted interface cards 2 is two or more (YES in St21), the CPU 10 executes a process in St22: otherwise (NO in St21), the CPU 10 ends the processing.

By referring to the card management table 110, the CPU 10 searches for, in descending order from the slot #K−1, the slot #M in which the interface card 2 is mounted (St22). In this case, when K is the smallest number among the slots, the CPU 10 performs searching in descending order from the slot with the largest number. When no interface card 2 is mounted in the slot whose slot number is smaller than K, the CPU 10 performs searching in descending order from the slot with the largest number.

Next, the CPU 10 performs control so that the circuit data 241 is copied from the first region in the flash memory 24 in the interface card 2 in the slot #K to the second region in the flash memory 24 in the interface card 2 in the slot #M (St23). Next, the CPU 10 updates the backup data type and the backup data version for the slot #M in the card management table 110 (St24).

Next, by referring to the card management table 110, the CPU 10 searches for, in ascending order from the slot #K+1, the slot #L in which the interface card 2 is mounted (St25). When K is the largest number among the slots, the CPU 10 performs searching in ascending order from the slot with the smallest number. When no interface card 2 is mounted in the slot whose slot number is larger than K, the CPU 10 also performs searching in ascending order from the slot with the smallest number.

Next, the CPU 10 performs control so that the circuit data 241 is copied from the first region in the flash memory 24 in the interface card 2 in the slot #L to the second region in the flash memory 24 in the interface card 2 in the slot #K (St26). As a result, a redundant configuration of the circuit data 241 is formed. The processes in St25 and St26 may also be executed prior to the process in St22.

Next, the CPU 10 updates the backup data type and the backup data version for the slot #K in the card management table 110 (St27). The processing when an interface card 2 is mounted is performed as described above.

In the present embodiment, each of the interface cards 2 has the first region and the second region that respectively store therein pieces of circuit data 241. The first region stores therein the circuit data 241 for the type of the local interface card 2. The second region stores therein the circuit data 241 for the type of another interface card 2.

Thus, according to the present embodiment, each interface card 2 holds not only the circuit data 241 for the type of local interface card 2 but also the circuit data 241 for another type of interface card 2. Thus, the transmission apparatus according to the present embodiment is capable of holding the circuit data 241 that are redundantly configured.

Third Embodiment

In the embodiment described above, when the interface card 2 is removed, if the same type of interface card 2 as the removed interface card 2 does not exist, the circuit data 241 for the type of the removed interface card 2 is deleted. In the examples in FIG. 10A and FIG. 10B, when the type-C interface card 2 is removed, type-C circuit data 241 stored in the second region in the slot #2 is overwritten with the type-D circuit data 241 and is thus deleted by the copy processing of the circuit data 241. In that case, since no type-C interface card 2 remains. Thus, when a type-C interface card 2 is newly mounted, the circuit data 241 is updated through downloading from the data center 4, and thus it takes a large amount of time.

Accordingly, it is desirable that, when the same type of interface card 2 as the type of the removed interface card 2 does not remain, the circuit data 241 for the type of the removed interface card 2 be saved in the portable memory (the second storage unit) 13 in the control card 1 in the circuit data 241, before the copy processing of the circuit data 241 is performed.

Figure 14A:
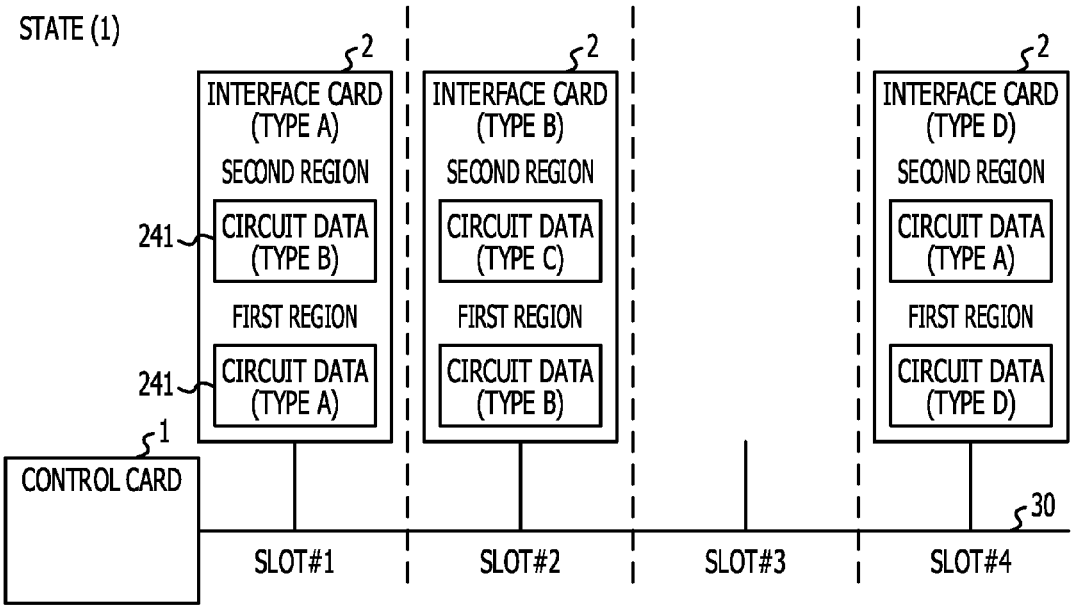
FIGS. 14A, 14B, and 14C illustrate an operation when the interface card is removed in a third embodiment.
Figure 14B:
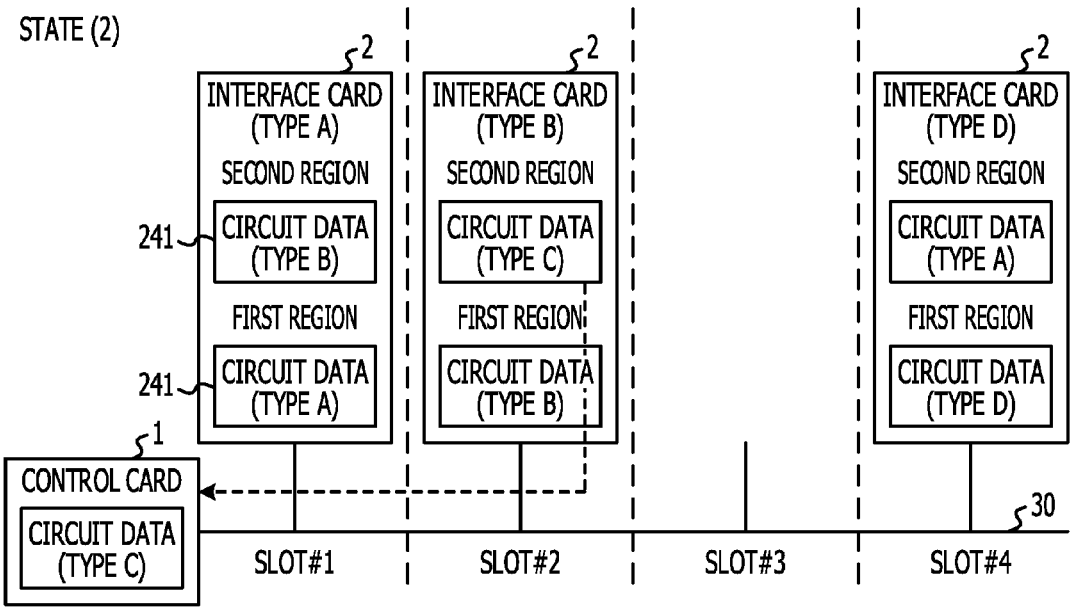
Figure 14C:
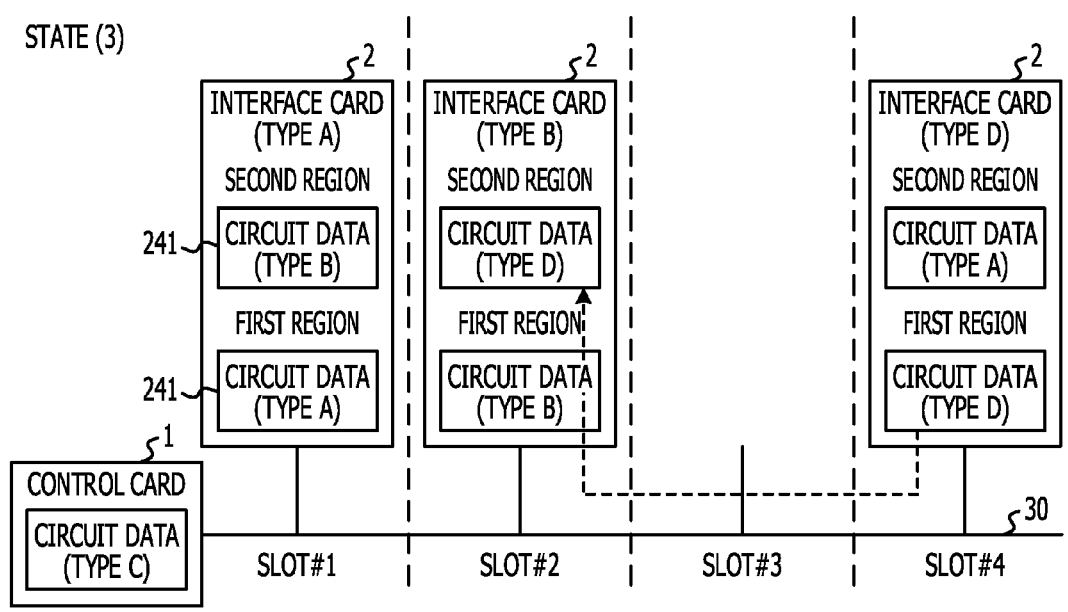
Figure 15A:
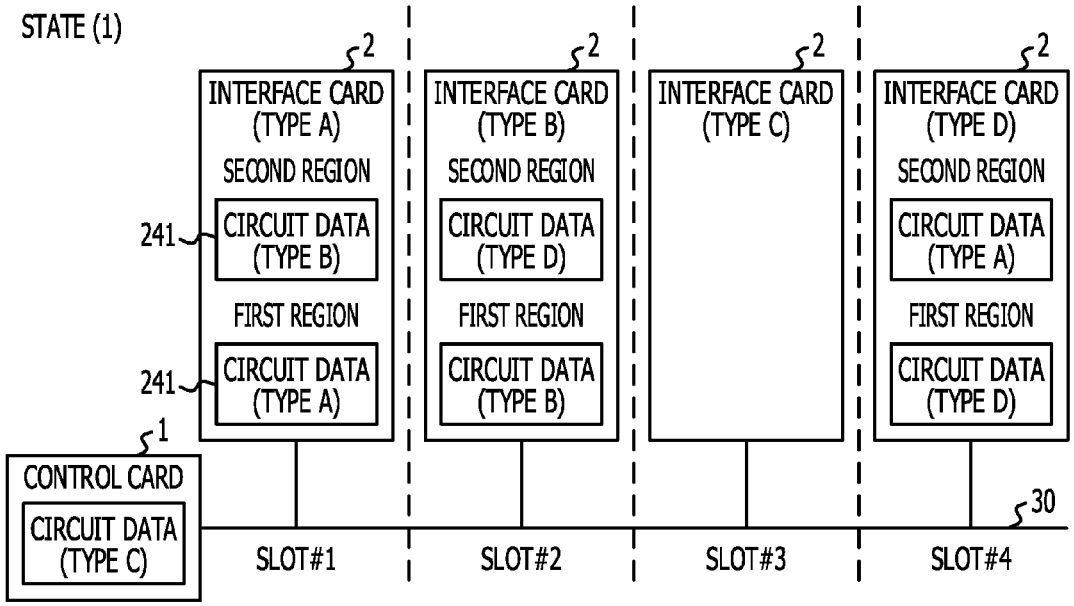
FIGS. 15A, 15B, 15C, and 15D illustrate an operation when an interface card is mounted in the third embodiment.
Figure 15B:
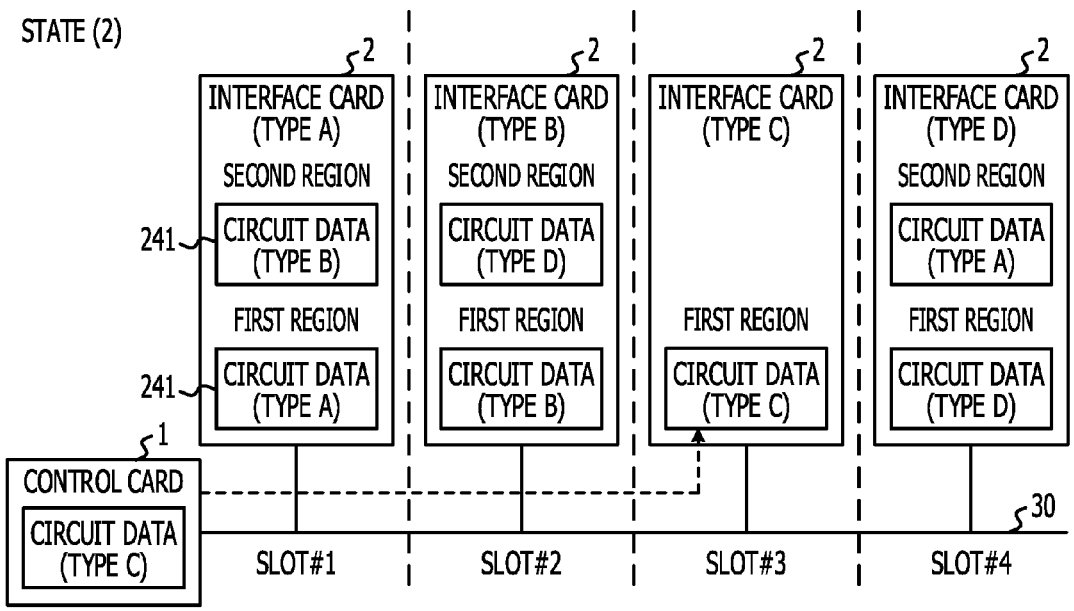
Figure 15C:
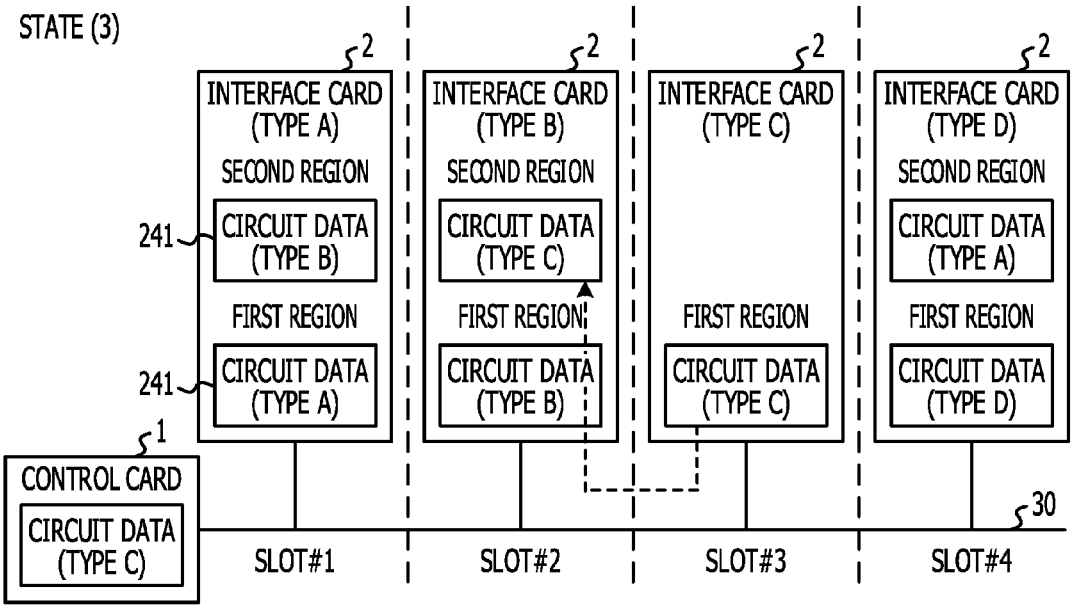
Figure 15D:
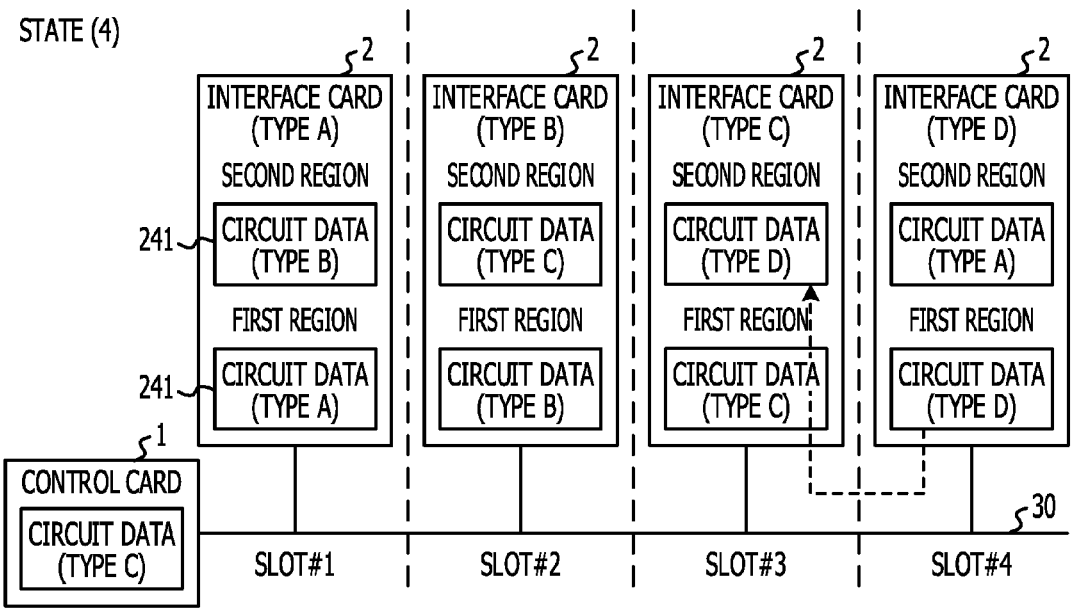

FIGS. 14A, 14B, and 14C illustrate an operation when the interface card 2 is removed in a third embodiment. FIGS. 14A, 14B, and 14C illustrate types (type A to type D) of interface cards 2 and the types (type A to type D) of circuit data 241 stored in the first regions and the second regions in the flash memories 24 in the interface cards 2. FIGS. 14A, 14B, and 14C also illustrate the types (type A to type D) of the circuit data 241 stored in the portable memory 13 in the control card 1.

FIGS. 14A, 14B, and 14C illustrate states (1) to (3) after the interface card 2 in the slot #3 is removed in the state illustrated in FIG. 8, in accordance with a time sequence.

First, in state (1), upon detecting that the interface card 2 in the slot #3 is removed, the CPU 10 in the control card 1 updates information regarding the slot #3 in the card management table 110. That is, the CPU 10 updates the "card type" and the "data version" for the card #3 to null states ("-").

Next, in state (2), since another interface card 2 that is of the same type type (type C) as the removed interface card 2 does not exist, the CPU 10 in the control card 1 saves the type-C circuit data 241 to the portable memory 13. That is, the CPU 10 in the control card 1 reads the type-C circuit data 241 from the second region in the interface card 2 in the slot #2 and stores the read type-C circuit data 241 in the portable memory 13.

At this point in time, the CPU 10 in the control card 1 issues, to the interface card 2 in the slot #2, an instruction for sending the circuit data 241 in the first region in the flash memory 24. Upon receiving the instruction, the CPU 20 in the interface card 2 reads the circuit data 241 in the first region in the flash memory 24 and sends the read circuit data 241 to the control card 1 through the bus line 30. Upon receiving the circuit data 241, the CPU 10 in the control card 1 stores the circuit data 241 in the portable memory 13.

Next, in state (3), the CPU 10 in the control card 1 searches for the slot number #2, which is the next smallest number after the slot number of the slot #3 from which the interface card 2 was removed. The CPU 10 in the control card 1 searches for the slot number #4, which is the next largest number after the slot number of the slot #3 from which the interface card 2 was removed.

The CPU 10 in the control card 1 performs control so that the circuit data 241 is copied from the first region in the flash memory 24 in the interface card 2 in the slot #4 to the second region in the flash memory 24 in the interface card 2 in the slot #2. Thus, the redundant configuration of the circuit data 241 is formed again. The procedure for the copy processing is analogous to that described above with reference to FIGS. 5A and 5B.

Accordingly, when the type-C interface card 2 is removed and another interface card 2 of the same type does not remain, the control card 1 is capable of holding the type-C circuit data 241.

FIGS. 15A, 15B, 15C, and 15D illustrate an operation when an interface card 2 is mounted in the third embodiment. FIGS. 15A, 15B, 15C, and 15D illustrates states (1) to (4) after a type-C interface card 2 is mounted in the slot #3 in the state illustrated in FIG. 14C, in accordance with a time sequence. A possible example of a case in which the same type of interface card 2 as the type of a removed interface card 2 is mounted is a case in which the interface card 2 is replaced because of a failure or the like.

First, in state (1), upon detecting that a type-C interface card 2 is mounted in the slot #3, the CPU 10 in the control card 1 updates the card management table 110.

Next, in state (2), since the type-C circuit data 241 stored in the portable memory 13 corresponds to the interface card 2 in the slot #3, the CPU 10 in the control card 1 copies the circuit data 241 to the first region in the interface card 2. The type and the version of the circuit data 241 stored in the portable memory 13 may also be recorded to, for example, the card management table 110 or may also be stored in another storage.

In this case, the CPU 10 in the control card 1 reads the circuit data 241 from the portable memory 13 and sends the read circuit data 241 to the interface card 2 in the slot #3 through the bus line 30. Upon receiving the circuit data 241, the CPU 20 in the interface card 2 stores the circuit data 241 in the first region in the flash memory 24. Thereafter, the circuit data 241 in the portable memory 13 may be deleted or may be continuously held.

Next, in state (3), the CPU 10 in the control card 1 searches for the slot number #2, which is the next smallest slot number after the slot number of the slot #3 in which the interface card 2 is mounted. The CPU 10 in the control card 1 then performs control so that the circuit data 241 is copied from the first region in the flash memory 24 in the interface card 2 in the slot #3 to the second region in the flash memory 24 in the interface card 2 in the slot #2.

In this case, the type-D circuit data 241 originally stored in the second region in the flash memory 24 in the interface card 2 in the slot #2 is overwritten with the type-A circuit data 241. As a result, the backup circuit data 241 for the type of the interface card 2 in the slot #3 is held in the interface card 2 in the slot #2.

Next, in state (4), the CPU 10 in the control card 1 searches for the slot number #4, which is the next largest slot number after the slot number of the slot #3 in which the interface card 2 is mounted. The CPU 10 in the control card 1 then performs control so that the circuit data 241 is copied from the first region in the flash memory 24 in the interface card 2 in the slot #4 to the second region in the flash memory 24 in the interface card 2 in the slot #3. As a result, the backup circuit data 241 for the type of the interface card 2 in the slot #4 is held in the interface card 2 in the slot #3. Thus, the redundant configuration of the circuit data 241 is formed again.

Figure 16:
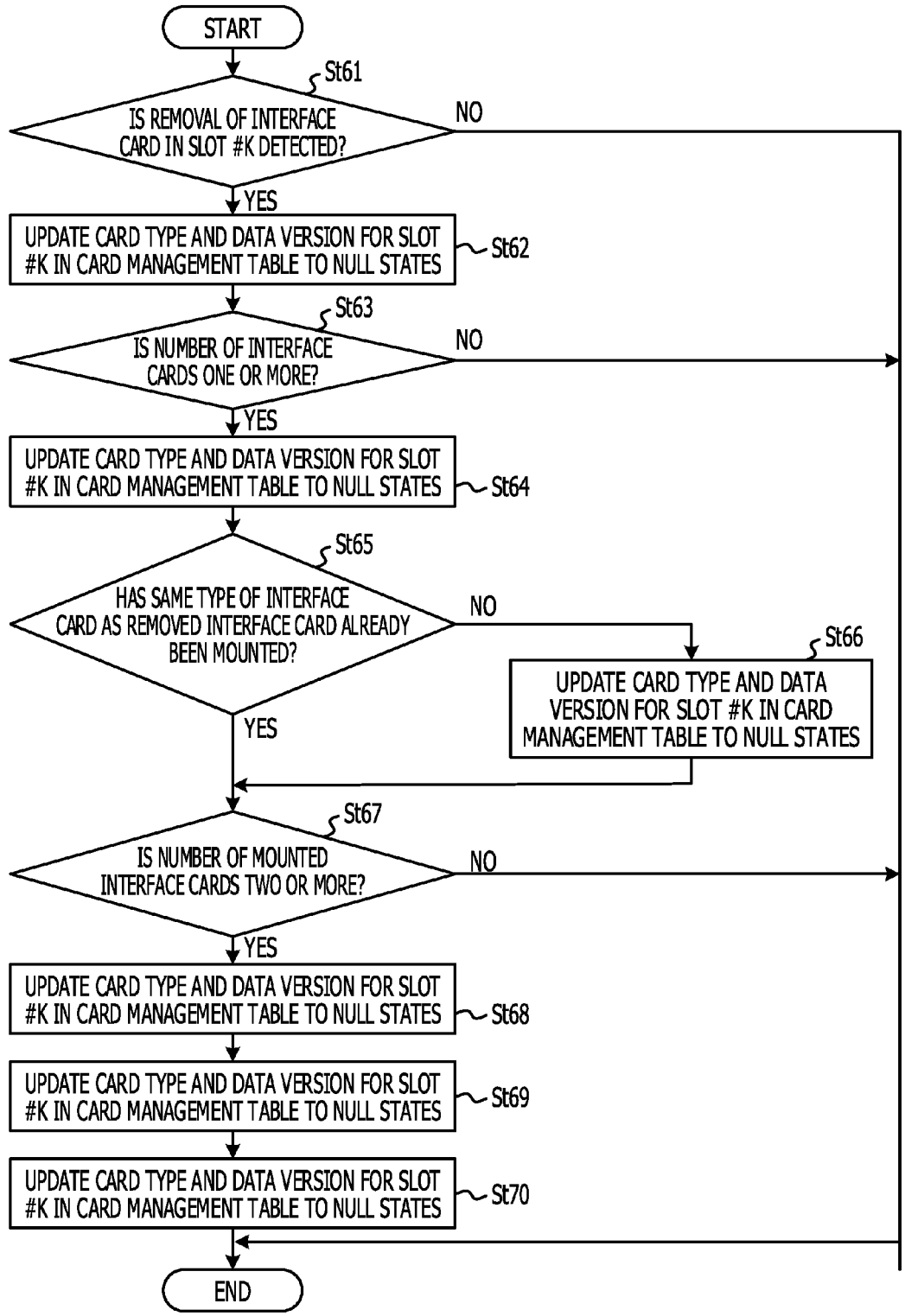
FIG. 16 is a flowchart illustrating processing when the interface card is removed in the third embodiment.

FIG. 16 is a flowchart illustrating processing when the interface card 2 is removed in the third embodiment. Upon detecting that the interface card 2 in the slot #K is removed (YES in St61), the CPU 10 in the control card 1 executes a process in St62; otherwise (NO in St61), the CPU 10 ends the processing.

The CPU 10 updates the card type and the data version for the slot #K in the card management table 110 to null states (that is, "-" in FIG. 3) (St62). Next, by referring to the card management table 110, the CPU 10 determines whether or not the number of interface cards 2 is one or more (St63). When the number of interface cards 2 is one or more (YES in St63), the CPU 10 executes processing in St64; otherwise (NO in St63), the CPU 10 ends the processing.

Next, by referring to the card management table 110, the CPU 10 searches for, in descending order from the slot #K−1, the slot #M in which the interface card 2 is mounted (St64). When K is the smallest number among the slots, the CPU 10 performs searching in descending order from the slot with the largest number. When no interface card 2 is mounted in the slot whose slot number is smaller than K, the CPU 10 performs searching in descending order from the slot with largest number.

Next, by referring to the card management table 110, the CPU 10 determines whether or not the same type of interface card 2 as the removed interface card 2 has already been mounted (St65). When the same type of interface card 2 has already been mounted (YES in St65), the CPU 10 executes a process in St67.

On the other hand, when the same type of the interface card 2 has not been mounted (NO in St65), the CPU 10 copies the circuit data 241 stored in the second region in the interface card 2 in the slot #M to the portable memory 13 (St66).

Next, by referring to the card management table 110, the CPU 10 determines whether or not the number of mounted interface cards 2 two or more (St67). When the number of mounted interface cards 2 is two or more (YES in St67), the CPU 10 executes a process in St68; otherwise (NO in St67), the CPU 10 ends the processing.

Next, by referring to the card management table 110, the CPU 10 searches for, in ascending order from the slot #K+1, the slot #L in which the interface card 2 is mounted (St68). When K is the largest number among the slots, the CPU 10 performs searching in ascending order from the slot with smallest number. When no interface card 2 is mounted in the slot whose slot number is larger than K, the CPU 10 also performs searching in ascending order from the slot with the smallest number.

Next, the CPU 10 performs control so that the circuit data 241 is copied from the first region in the flash memory 24 in the interface card 2 in the slot #L to the second region in the flash memory 24 in the interface card 2 in the slot #M (St69). As a result, a redundant configuration of the circuit data 241 is formed.

Next, the CPU 10 updates the backup data type and the backup data version for the slot #M in the card management table 110 (St70). The processing when the interface card 2 is removed is performed as described above.

Figure 17:
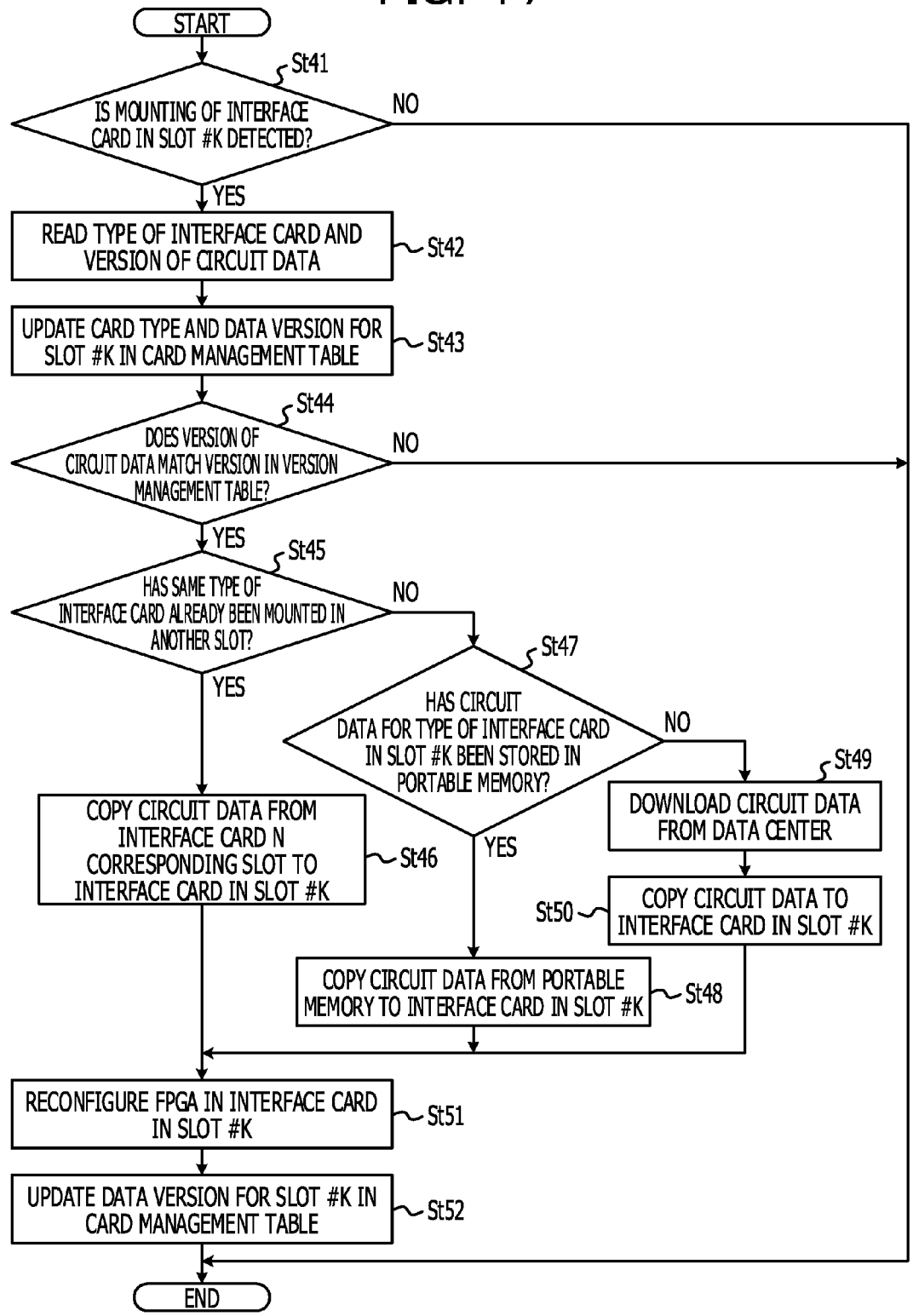
FIG. 17 is a flowchart illustrating processing when an interface card is mounted in the third embodiment.

FIG. 17 is a flowchart illustrating processing when an interface card 2 is mounted in the third embodiment. Upon detecting that the interface card 2 is newly mounted in the slot #K (YES in St41), the CPU 10 in the control card 1 executes a process in St42; otherwise (NO in St41), the CPU 10 ends the processing.

The CPU 10 reads the type of the interface card 2 and the version of the circuit data 241 from the newly mounted interface card 2 (St42). That is, the CPU 10 obtains the card information and the version information from the interface card 2.

Next, based on the read type of the interface card 2 and the read version of the circuit data 241, the CPU 10 updates the card type and the data version for the slot #K in the card management table 110 (St43). Next, with respect to the slot #K, the CPU 10 compares the version of the circuit data 241 with the version in the version management table 111 (St44). Through the comparison, the CPU 10 determines whether or not the circuit data 241 in the slot #K is the latest version.

When the result of the comparison indicates that the versions match each other (YES in St44), the CPU 10 determines that the update of the circuit data 241 in the slot #K may be omitted and then ends the processing. On the other hand, when the result of the comparison indicates that the versions do not match each other (NO in St44), the CPU 10 determines that the circuit data 241 in the slot #K is to be updated and executes a process in St45.

Based on the card management table 110, the CPU 10 determines whether or not the same type of interface card 2 as the type of the interface card 2 in the slot #K has already been mounted in another slot (St45). When the same type of the interface card 2 has already been mounted (YES in St45), the CPU 10 executes a process in St46.

In such a case, the CPU 10 performs control so that the circuit data 241 is copied from the interface card 2 in the corresponding slot to the interface card 2 in the slot #K (St46). As a result, the circuit data 241 stored in the first region in the flash memory 24 is updated in the interface card 2 in the slot #K.

On the other hand, when the same type of interface card 2 has not been mounted (NO in St45), the CPU 10 determines whether or not the circuit data 241 for the type of the interface card 2 in the slot #K has been stored in the portable memory 13 (St47). In this case, the CPU 10 makes the determination by referring to the card management table 110.

When the circuit data 241 for the type of the interface card 2 in the slot #K has been stored in the portable memory 13 (YES in St47), the CPU 10 copies the circuit data 241 from the portable memory 13 to the interface card 2 in the slot #K (St48).

When the circuit data 241 for the type of the interface card 2 in the slot #K has not been stored in the portable memory 13 (NO in St47), the CPU 10 downloads the circuit data 241 for the type of the interface card 2 in the slot #K from the data center 4 (St49). The CPU 10 then copies the downloaded circuit data 241 to the interface card 2 in the slot #K (St50). As a result, the circuit data 241 stored in the first region in the flash memory 24 is updated in the interface card 2 in the slot #K.

Next, the CPU 10 performs control so as to reconfigure the FPGA 25 in the interface card 2 in the slot #K (St51). Thus, the configuration circuit 23 in the interface card 2 in the slot #K reconfigures the FPGA 25, based on the updated circuit data 241.

Next, the CPU 10 updates the data version for the slot #K in the card management table 110 to the latest version (St52). Processing during mounting of an interface card 2 is performed as described above. After executing the processing illustrated in FIG. 17, the CPU 10 in the control card 1 executes substantially the same processing as that illustrated in FIG. 13.

As described above, in the present embodiment, upon detecting that any of the interface cards 2 is removed, the control card 1 determines whether or not the same type of interface card 2 as that of the removed the interface card 2 exists. When the same type of interface card 2 does not exist, the control card 1 reads the control data 241 corresponding to the type of the removed interface card 2 from the interface card 2 that stores the control data 241 in the second storage unit, and stores the circuit data 241 in the portable memory 13.

Thus, the control card 1 allows the circuit data 241 for the type of the removed interface card 2 to be saved so that the circuit data 241 is not lost, by storing it in the portable memory 13. Accordingly, after the saving, even when an interface card 2 of the same type as the removed interface card 2 is newly mounted, the control card 1 can copy the circuit data 241 stored in the portable memory 13 to the interface card 2. This enables the circuit data 241 to be updated in the mounted interface card 2.

As described above, the transmission apparatus according to the embodiment includes the plurality of interface cards 2 that are removably provided and that perform main-signal transmission processing and the control card 1 that detects mounting/removal of the plurality of interface cards 2 and that controls the plurality of interface cards 2. The interface cards 2 hold respective pieces of circuit data 241 regarding transmission processing and corresponding to the types of the interface cards 2. Upon detecting that an interface card 2 is newly mounted, the control card 1 performs control so that the circuit data 241 for the type of the mounted interface card 2 among the plurality of interface cards 2 is copied from the interface card 2 that holds the circuit data 241 is copied to the mounted interface card 2.

As described above, in the present embodiment, the plurality of interface cards 2 hold pieces of circuit data 241 regarding transmission processing and corresponding to the types of the interface cards 2. Upon detecting that an interface card 2 is newly mounted, the control card 1 performs control so that the circuit data 241 is copied from the same type of the interface card 2 among the already mounted interface cards 2 to the newly mounted interface card 2.

Thus, the circuit data 241 in the interface card 2 is updated by copying the circuit data 241 held by another interface card 2. Thus, the control card 1 may or may not hold the circuit data 241 for all types of interface card 2. Accordingly, the transmission apparatus according to the present embodiment can update a large number of pieces of circuit data 241 without increasing the storage capacity.

Although the embodiments described above are based on the premise that the circuit data 241 in the FPGA 25 is updated, the present technology is not limited thereto, and various other types of data may also be updated. Examples of such data include program data for driving a processor and a profile data that is set according to the type of interface card 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method to be executed by a processor included in a transmission apparatus, the control method comprising:
  receiving, from a first interface device storing first circuit data, a first version of the first circuit data at a time of coupling of the first interface device to the transmission apparatus;
  extracting, from a plurality of interface devices included in the transmission apparatus, second circuit data of a second interface device storing the second circuit data, where a second interface device type is a same as a first interface device type, when the second interface device exists in the plurality of interface devices and when the first version matches a second version stored in a memory, the second version being associated with the second interface device type of the second version stored in the memory; and
  copying the second circuit data to the first interface device.

2. The control method according to claim 1, further comprising:
  receiving, from a computer coupled to the transmission apparatus, third circuit data corresponding to the first interface device when the second interface device does not exist in the plurality of interface devices; and
  copying the third circuit data to the first interface device.

3. The control method according to claim 2, further comprising:
   requesting the computer to transmit the third circuit data corresponding to the first interface device when the second interface device does not exist in the plurality of interface devices.

4. The control method according to claim 2, wherein the receiving of the third circuit data includes receiving, from a data center that stores circuit data for the first interface device and each of the plurality of interface devices, the third circuit data corresponding to the first interface device.

5. The control method according to claim 1, further comprising:
   conducting a reconfiguration of a field programmable gate array in the first interface device based on the second circuit data.

6. The control method according to claim 1, further comprising:
   storing information of the first interface device type and the first version associated with each other in the memory.

7. The control method according to claim 6, further comprising:
   deleting the information of the first interface device type and the first version stored in the memory when the first interface device is decoupled from the transmission apparatus.

8. The control method according to claim 1, wherein the copying of the second circuit data includes copying the second circuit data to a first region of the first interface device; and
   the control method further comprises:
   extracting, from the plurality of interface devices except for the second interface device, a third interface device based on a slot number of the first interface device; and
   copying fourth circuit data of the third interface device to a second region of the first interface device.

9. The control method according to claim 8, wherein the extracting of the third interface device includes extracting the third interface device coupled to a slot with another number next to the slot number of the first interface device in ascending order.

10. The control method according to claim 9, further comprising:
    updating the second region of a fourth interface device coupled to a further slot with a further number next to the slot number of the first interface device in descending order, when the first interface device is decoupled from the transmission apparatus.

11. A transmission apparatus, comprising:
    a memory, and
    a processor coupled to the memory and configured to:
        receive, from the first interface device storing first circuit data, a first version of the first circuit data at a time of coupling of the first interface device to the transmission apparatus;
        extract, from a plurality of interface devices included in the transmission apparatus, second circuit data of a second interface device storing the second circuit data, where a second interface type is a same as a first interface device type, when the second interface device exists in the plurality of interface devices and when the first version matches a second version stored in a memory, the second version being associated with the second interface device type of the second version stored in the memory; and
        copy the second circuit data of the second interface device to the first interface device.

12. A computer-readable non-transitory recording medium storing a program causing a computer to execute a process, the process comprising:
    receiving, from a first interface device storing first circuit data, a first version of the first circuit data at a time of coupling of the first interface device to the transmission apparatus;
    extracting, from a plurality of interface devices included in the transmission apparatus, second circuit data of a second interface device storing the second circuit data, where a second interface device type is a same as a first interface device type, when the second interface device exists in the plurality of interface devices and when the first version matches a second version stored in a memory, the second version being associated with the second interface device type of the second version stored in the memory; and
    copying the second circuit data to the first interface device.

* * * * *